United States Patent
Sills et al.

(10) Patent No.: US 9,594,372 B1
(45) Date of Patent: Mar. 14, 2017

(54) METHODS AND SYSTEMS FOR PROVIDING FEEDBACK BASED ON INFORMATION RECEIVED FROM AN AERIAL VEHICLE

(71) Applicant: X Development LLC, Mountain View, CA (US)

(72) Inventors: Maxwell Andrew Sills, San Francisco, CA (US); Robert Samuel Gordon, San Bruno, CA (US); Ian Wetherbee, San Jose, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/002,733

(22) Filed: Jan. 21, 2016

(51) Int. Cl.
| | |
|---|---|
| G05D 1/00 | (2006.01) |
| B64C 39/02 | (2006.01) |
| G05D 1/10 | (2006.01) |
| G01C 21/36 | (2006.01) |

(52) U.S. Cl.
CPC .......... G05D 1/0011 (2013.01); B64C 39/024 (2013.01); G01C 21/3629 (2013.01); G01C 21/3652 (2013.01); G05D 1/0094 (2013.01); G05D 1/101 (2013.01)

(58) Field of Classification Search
CPC .............................. B64C 39/024; G08G 5/0039
See application file for complete search history.

(56) References Cited

U.S. PATENT DOCUMENTS

| | | | |
|---|---|---|---|
| 8,521,339 B2* | 8/2013 | Gariepy ................ | B64C 39/024 244/190 |
| 8,930,044 B1* | 1/2015 | Peeters ................... | B64C 19/00 701/2 |
| 9,412,278 B1* | 8/2016 | Gong .................... | G08G 5/0039 |
| 2007/0252035 A1* | 11/2007 | Hubbard, Jr. .......... | B64C 13/16 244/75.1 |
| 2008/0120029 A1 | 5/2008 | Zelek | |
| 2010/0302359 A1* | 12/2010 | Adams .................. | B64C 39/024 348/117 |
| 2012/0062357 A1 | 3/2012 | Slamka | |
| 2012/0124470 A1 | 5/2012 | West | |
| 2012/0271461 A1* | 10/2012 | Spata ...................... | G01W 1/00 700/276 |

(Continued)

*Primary Examiner* — Thomas Tarcza
*Assistant Examiner* — Alex C Dunn
(74) *Attorney, Agent, or Firm* — McDonnell Boehnen Hulbert & Berghoff LLP

(57) ABSTRACT

Described herein is a control system that facilitates assistance mode(s). In particular, the control system may determine a particular assistance mode associated with an account. This particular assistance mode may specify (i) operations for an aerial vehicle to carry out in order to obtain sensor data providing environment information corresponding to a location associated with the account and (ii) feedback processes to provide feedback, via a feedback system associated with the account, that corresponds to respective environment information. The control system may transmit to the aerial vehicle an indication of the particular operations corresponding to the particular assistance mode and may then receive environment information for the location associated with the account. Based on the received environment information, the control system may apply the specified feedback processes to initiate feedback in accordance with the particular assistance mode via the associated feedback system.

20 Claims, 13 Drawing Sheets

(56) References Cited

U.S. PATENT DOCUMENTS

| | | |
|---|---|---|
| 2013/0131985 A1 | 5/2013 | Weiland |
| 2014/0019522 A1* | 1/2014 | Weng ................. G06F 17/30964 |
| | | 709/203 |
| 2015/0142211 A1* | 5/2015 | Shehata ................. H04N 7/181 |
| | | 701/2 |
| 2015/0147976 A1* | 5/2015 | Wang ................... G05D 1/0022 |
| | | 455/65 |
| 2015/0346718 A1 | 12/2015 | Stenneth |
| 2015/0346722 A1* | 12/2015 | Herz ................... G05D 1/0038 |
| | | 701/2 |

* cited by examiner

METHODS AND SYSTEMS FOR PROVIDING FEEDBACK BASED ON INFORMATION RECEIVED FROM AN AERIAL VEHICLE

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Example implementations may relate to a control system that is programmatically arranged to assist a user by facilitating feedback processes based on information about the environment that the control system receives from an aerial vehicle, such as from an unmanned aerial vehicle (UAV) for instance. In particular, the control system may determine a particular assistance mode that is associated with an account (e.g., a user-account set up for the user). As an example, the particular assistance mode may be an assistance mode intended to assist a visually-impaired user with navigation through the environment or may take other forms. Regardless, the particular assistance mode may specify particular operations that the aerial vehicle should carry out in order to collect environment information at a location (e.g., a GPS location) associated with the account. Moreover, the particular assistance mode may specify feedback processes that initiate feedback that corresponds to received environment information. In practice, this initiated feedback may be provided via a feedback system associated with the account, such as via a wearable feedback system that is worn by the user for instance.

Given these arrangements, the control system may inform the aerial vehicle of the determined assistance mode and/or of the operations specified in the determined assistance mode. Once the aerial vehicle receives this information, the aerial vehicle may then begin operating in accordance with the specified operation, so as to collect sensor data and to ultimately provide environment information to the control system. And when the control system receives environment information from the aerial vehicle, the control system may use the received environment information as a basis to apply corresponding feedback processes that initiate feedback via the associated feedback system.

In one aspect, a method is provided. The method involves determining, by a control system, a particular assistance mode associated with an account, where the particular assistance mode specifies (i) particular operations for an aerial vehicle to carry out in order to obtain sensor data providing environment information corresponding to a location associated with the account and (ii) feedback processes to provide feedback, via a feedback system associated with the account, that corresponds to respective environment information. The method also involves transmitting, by the control system to the aerial vehicle, at least an indication of the particular operations corresponding to the particular assistance mode. The method additionally involves receiving, by the control system, environment information for the location associated with the account, where the received environment information is based on the particular operations corresponding to the particular assistance mode. The method further involves, based on the received environment information for the location associated with the account, applying, by the control system, the specified feedback processes to initiate feedback in accordance with the particular assistance mode via the associated feedback system.

In another aspect, a non-transitory computer readable medium is provided. The non-transitory computer readable medium has stored therein instructions executable by one or more processors to cause a control system to determine a particular assistance mode associated with an account, where the particular assistance mode specifies (i) particular operations for an aerial vehicle to carry out in order to obtain sensor data providing environment information corresponding to a location associated with the account and (ii) feedback processes to provide feedback, via a feedback system associated with the account, that corresponds to respective environment information. The instructions are also executable to transmit, to the aerial vehicle, at least an indication of the particular operations corresponding to the particular assistance mode. The instructions are additionally executable to receive environment information for the location associated with the account, where the received environment information is based on the particular operations corresponding to the particular assistance mode. The instructions are further executable to, based on the received environment information for the location associated with the account, applying the specified feedback processes to initiate feedback in accordance with the particular assistance mode via the associated feedback system.

In yet another aspect, a control system is provided. The control system includes one or more processors, a non-transitory computer readable medium, and program instructions stored on the non-transitory computer readable medium and executable by the one or more processors to determine a particular assistance mode associated with an account, where the particular assistance mode specifies (i) particular operations for an aerial vehicle to carry out in order to obtain sensor data providing environment information corresponding to a location associated with the account and (ii) feedback processes to provide feedback, via a feedback system associated with the account, that corresponds to respective environment information. The program instructions are also executable to transmit, to the aerial vehicle, at least an indication of the particular operations corresponding to the particular assistance mode. The program instructions are additionally executable to receive environment information for the location associated with the account, where the received environment information is based on the particular operations corresponding to the particular assistance mode. The program instructions are further executable to, based on the received environment information for the location associated with the account, apply the specified feedback processes to initiate feedback in accordance with the particular assistance mode via the associated feedback system.

In yet another aspect, a system is provided. The system may include means for determining a particular assistance mode associated with an account, where the particular assistance mode specifies (i) particular operations for an aerial vehicle to carry out in order to obtain sensor data providing environment information corresponding to a location associated with the account and (ii) feedback processes to provide feedback, via a feedback system associated with the account, that corresponds to respective environment information. The system may also include means for transmitting, to the aerial vehicle, at least an indication of the particular operations corresponding to the particular assistance mode. The system may additionally include means for receiving environment information for the location associated with the account, where the received environment information is based on the particular operations corresponding to the particular assistance mode. The system may further include means for, based on the received environment information for the location associated with the account, applying the specified feedback processes to initiate feedback in accordance with the particular assistance mode via the associated feedback system.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
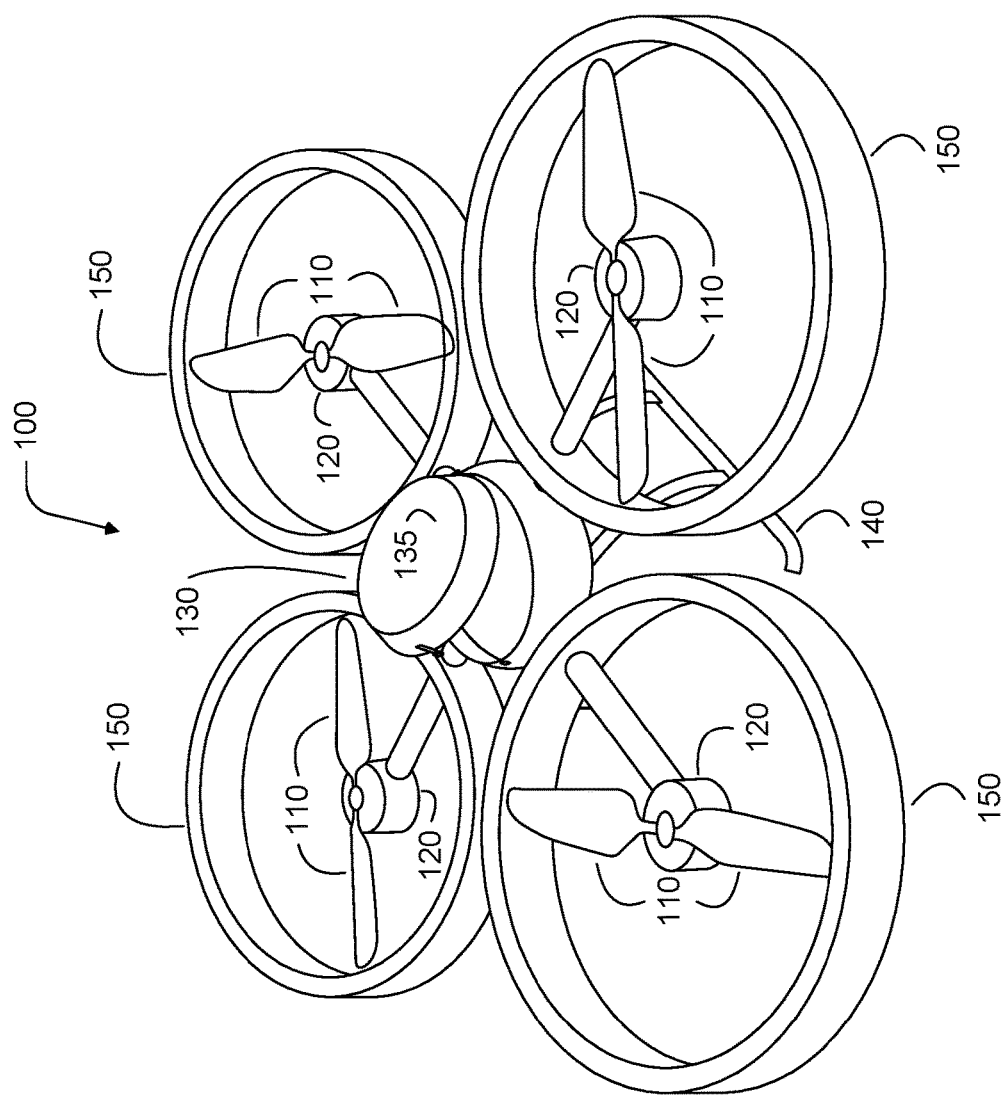
FIGS. 1, 2, 3, and 4 are simplified illustrations of unmanned aerial vehicles, according to example embodiments.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

In practice, certain individuals may use various technological tools or systems when in need of assistance with carrying out certain tasks in the environment. For example, a visually-impaired individual may use a cane to navigate the environment. And in another example, a hearing-impaired individual may use hearing aids to get assistance with understanding of sounds in the environment. In this manner, different tools and systems may be designed to be used for different tasks, which may result in different individuals using different systems when in need of different forms of assistance.

Example implementations may relate to a control system that can facilitate different feedback processes to ultimately assist different types of user, and these feedback processes may be based on environment information that the control system receives from an aerial vehicle. To receive feedback, a given user may use a feedback system that may be in communication with or otherwise includes the control system, and this feedback system could take the form of a wearable feedback system (e.g., a head-mountable device (HIVID), a vest, and/or clothing items etc.) that can provide vibrational, auditory, and/or visual feedback, among other possibilities. Moreover, the given user may set up a user-account (e.g., via a graphical user interface (GUI) on a mobile device) that may indicate at least one assistance mode through which the given user is to be assisted.

In particular, the control system may have stored thereon or may otherwise have access to information related to various assistance modes. As an example, the control system may have information specified for an assistance mode that is meant to assist a visually-impaired individual, may have other information specified for an assistance mode that is meant to assist a hearing-impaired individual, and/or may have yet other information specified for an assistance mode that is meant to assist any user with navigation to a certain destination, among other possibilities. With this arrangement, a given assistance mode may thus specify particular operations that the aerial vehicle should carry out in order to obtain environment information (e.g., sensor data) for a location associated with the user-account, such as for an area within a ten meter radius of a current GPS location of the given user for instance. Additionally, a given assistance mode may also specify various feedback processes that initiate feedback corresponding to received environment information. In practice, this feedback may specifically be initiated via a feedback system associated with the user-account, so that the given individual is provided with feedback indicative of the received environment information.

Accordingly, the control system may determine a particular assistance mode that is associated with the account and may then inform the aerial vehicle of the operations specified in the particular assistance mode and/or may simply inform the aerial vehicle of what the determined assistance mode is, among other options. Once the aerial vehicle receives this information, the aerial vehicle may then operate in accordance with the assistance mode by carrying out specified operations. And when the aerial vehicle does so, the control system may receive from the aerial vehicle environment information that is obtained in accordance with the assistance mode. Based on the received environment information, the control system may then use information specified in the determined assistance mode in order to determine a corresponding feedback process to initiate feedback that indicative of the received environment information. As such, the control system may apply the feedback process to initiate this feedback via a feedback system associated with the given account.

By way of example, the control system may determine that the assistance mode associated with a certain account is an assistance mode arranged to assist a visually-impaired user. Once the control system determines the assistance mode, the control system may inform the aerial vehicle of the determined assistance mode and the aerial vehicle may then begin to operate in accordance with the determined assistance mode. When the aerial vehicle operates in this manner, the control system may receive environment information over time and may evaluate the received environment information to determine corresponding feedback processes over time.

For instance, the control system may determine that certain environment information indicates that an obstacle is positioned to the left of the location associated with the account, which may be to the left (e.g., relative to a forward facing orientation of the user) of a current GPS location of the visually-impaired user. Responsively, the control system may determine a corresponding feedback process to initiate feedback that indicates that the obstacle is positioned to the left of the location associated with the account and the control system may apply the corresponding feedback process. In this example, the corresponding feedback process may initiate vibrational feedback by one or more vibration-generating devices that are each in contact with the left portion of the user's body when the wearable feedback system (e.g., a vest) is worn by the user. In this manner, the visually-impaired user could receive feedback based on which the visually-impaired user may then be aware of the obstacle at issue. Other examples are also possible.

II. ILLUSTRATIVE UNMANNED VEHICLES

Herein, the terms "unmanned aerial vehicle" and "UAV" refer to any autonomous or semi-autonomous vehicle that is capable of performing some functions without a physically present human pilot. Examples of flight-related functions may include, but are not limited to, sensing its environment or operating in the air without a need for input from an operator, among others.

A UAV may be autonomous or semi-autonomous. For instance, some functions may be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

FIG. 1 is a simplified illustration of a UAV, according to an example embodiment. In particular, FIG. 1 shows an example of a rotorcraft 100 that is commonly referred to as a multicopter. Multicopter 100 may also be referred to as a quadcopter, as it includes four rotors 110. It should be understood that example embodiments may involve rotorcraft with more or less rotors than multicopter 100. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 100 in greater detail, the four rotors 110 provide propulsion and maneuverability for the multicopter 100. More specifically, each rotor 110 includes blades that are attached to a motor 120. Configured as such the rotors may allow the multicopter 100 to take off and land vertically, to maneuver in any direction, and/or to hover. Furthermore, the pitch of the blades may be adjusted as a group and/or differentially, and may allow a multicopter 110 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 100. Blade-pitch adjustment may be particularly useful for rotorcraft with substantial inertia in the rotors and/or drive train, but is not limited to such rotorcraft.

Additionally or alternatively, multicopter 100 may propel and maneuver itself adjust the rotation rate of the motors, collectively or differentially. This technique may be particularly useful for small electric rotorcraft with low inertia in the motors and/or rotor system, but is not limited to such rotorcraft.

Multicopter 100 also includes a central enclosure 130 with a hinged lid 135. The central enclosure may contain, e.g., control electronics such as an inertial measurement unit (IMU) and/or an electronic speed controller, batteries, other sensors, and/or a payload, among other possibilities.

The illustrative multicopter 100 also includes landing gear 140 to assist with controlled take-offs and landings. In other embodiments, multicopters and other types of UAVs without landing gear are also possible.

In a further aspect, multicopter 100 includes rotor protectors 150. Such rotor protectors 150 can serve multiple purposes, such as protecting the rotors 110 from damage if the multicopter 100 strays too close to an object, protecting the multicopter 100 structure from damage, and protecting nearby objects from being damaged by the rotors 110. It should be understood that in other embodiments, multicopters and other types of UAVs without rotor protectors are also possible. Further, rotor protectors of different shapes, sizes, and function are possible, without departing from the scope of the invention.

A multicopter 100 may control the direction and/or speed of its movement by controlling its pitch, roll, yaw, and/or altitude. To do so, multicopter 100 may increase or decrease the speeds at which the rotors 110 spin. For example, by maintaining a constant speed of three rotors 110 and decreasing the speed of a fourth rotor, the multicopter 100 can roll right, roll left, pitch forward, or pitch backward, depending upon which motor has its speed decreased. Specifically, the multicopter may roll in the direction of the motor with the decreased speed. As another example, increasing or decreasing the speed of all rotors 110 simultaneously can result in the multicopter 100 increasing or decreasing its altitude, respectively. As yet another example, increasing or decreasing the speed of rotors 110 that are turning in the same direction can result in the multicopter 100 performing a yaw-left or yaw-right movement. These are but a few examples of the different types of movement that can be accomplished by independently or collectively adjusting the RPM and/or the direction that rotors 110 are spinning.

Figure 2:
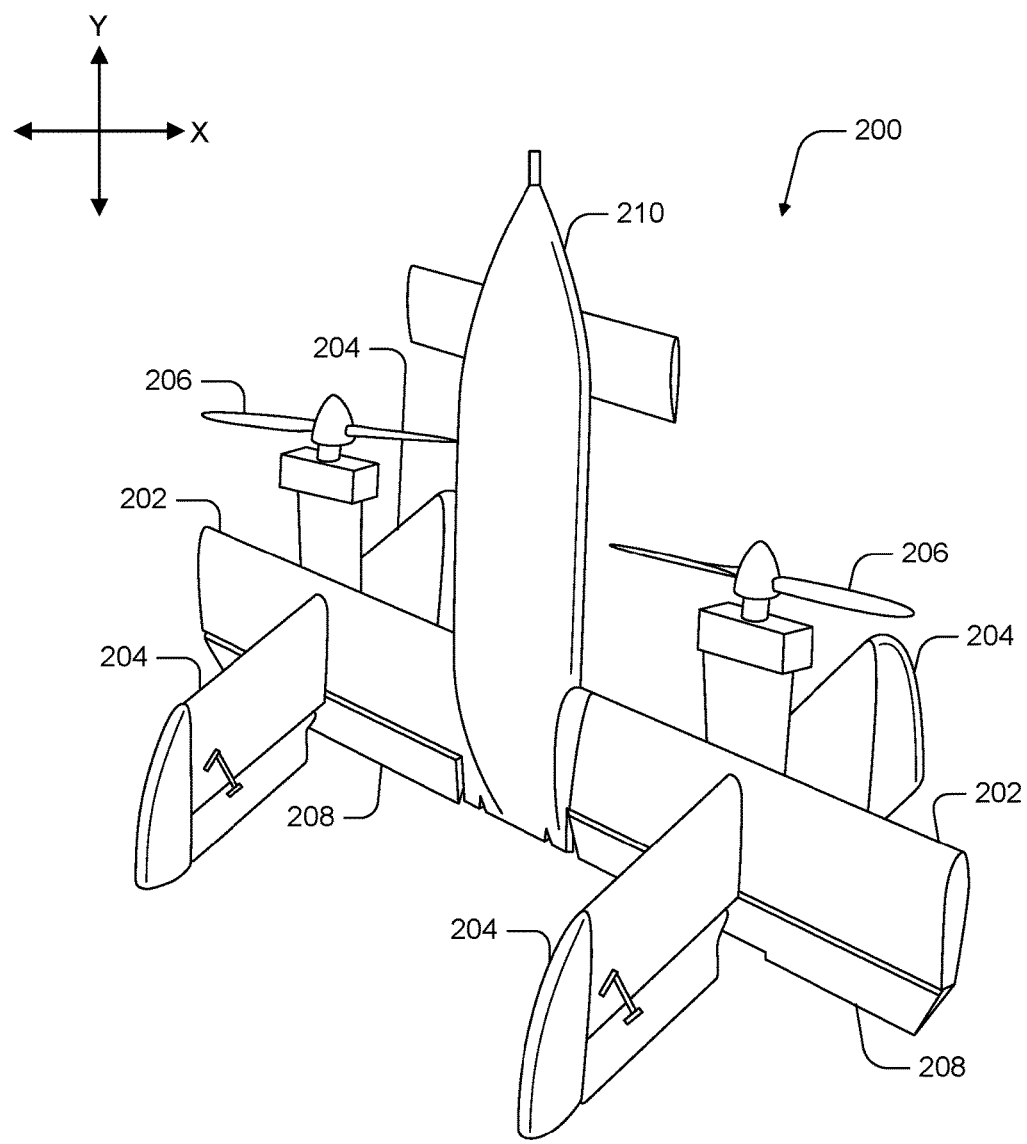

FIG. 2 is a simplified illustration of a UAV, according to an example embodiment. In particular, FIG. 2 shows an example of a tail-sitter UAV 200. In the illustrated example, the tail-sitter UAV 200 has fixed wings 202 to provide lift and allow the UAV to glide horizontally (e.g., along the x-axis, in a position that is approximately perpendicular to the position shown in FIG. 2). However, the fixed wings 202 also allow the tail-sitter UAV 200 take off and land vertically on its own.

For example, at a launch site, tail-sitter UAV 200 may be positioned vertically (as shown) with fins 204 and/or wings 202 resting on the ground and stabilizing the UAV in the vertical position. The tail-sitter UAV 200 may then take off by operating propellers 206 to generate the upward thrust (e.g., a thrust that is generally along the y-axis). Once at a suitable altitude, the tail-sitter UAV 200 may use its flaps 208 to reorient itself in a horizontal position, such that the fuselage 210 is closer to being aligned with the x-axis than the y-axis. Positioned horizontally, the propellers 206 may provide forward thrust so that the tail-sitter UAV 200 can fly in a similar manner as a typical airplane.

Variations on the illustrated tail-sitter UAV 200 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 200 are also possible.

As noted above, some embodiments may involve other types of UAVs, in addition or in the alternative to multicopters. For instance, FIGS. 3 and 4 are simplified illustrations of other types of UAVs, according to example embodiments.

Figure 3:
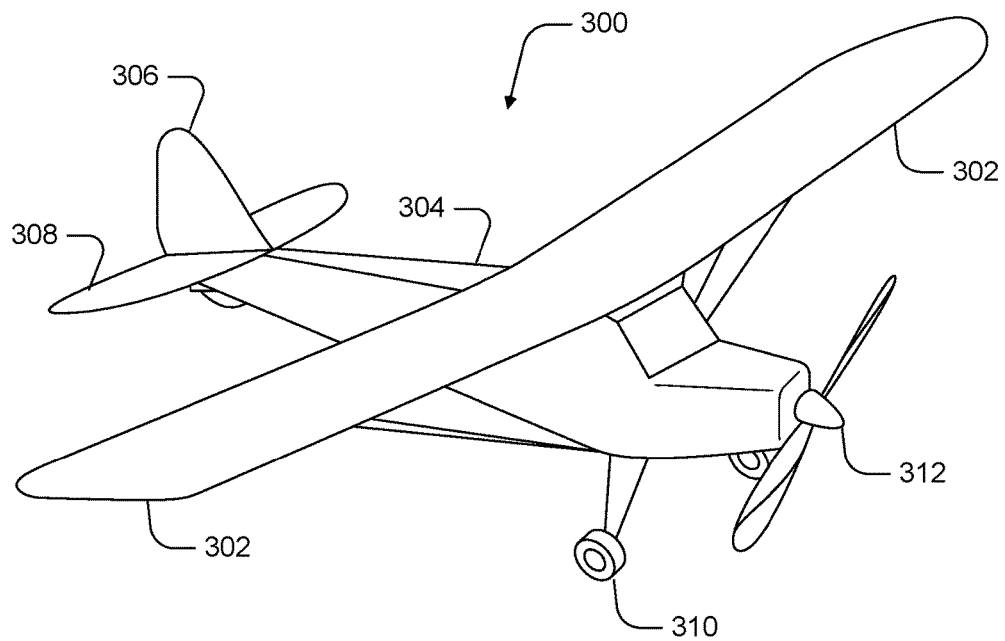

In particular, FIG. 3 shows an example of a fixed-wing aircraft 300, which may also be referred to as an airplane, an aeroplane, or simply a plane. A fixed-wing aircraft 300, as the name implies, has stationary wings 302 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 3 depicts some common structures used in a fixed-wing aircraft 300. In particular, fixed-wing aircraft 300 includes a fuselage 304, two horizontal wings 302 with an airfoil-shaped cross section to produce an aerodynamic force, a vertical stabilizer 306 (or fin) to stabilize the plane's yaw (turn left or right), a horizontal stabilizer 308 (also referred to as an elevator or tailplane) to stabilize pitch (tilt up or down), landing gear 310, and a propulsion unit 312, which can include a motor, shaft, and propeller.

Figure 4:
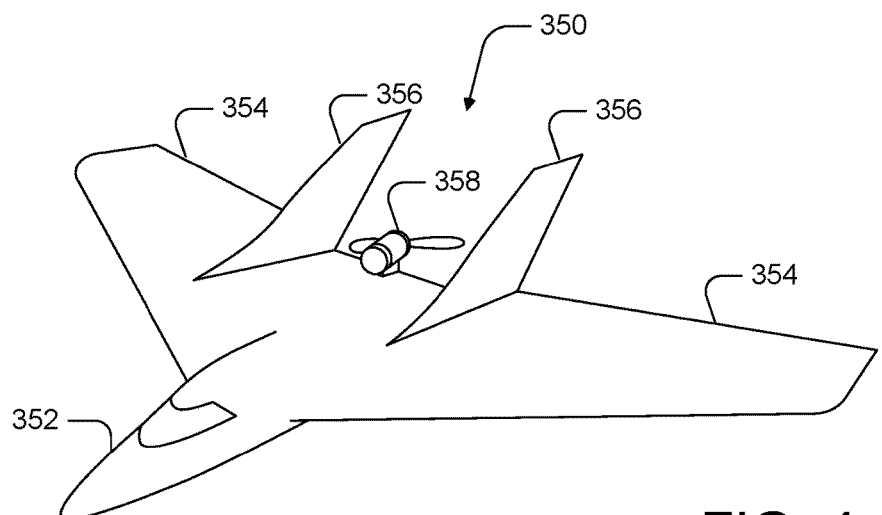

FIG. 4 shows an example of an aircraft 350 with a propeller in a pusher configuration. The term "pusher" refers to the fact that the propulsion unit 358 is mounted at the back of the aircraft and "pushes" the vehicle forward, in contrast to the propulsion unit being mounted at the front of the aircraft. Similar to the description provided for FIG. 3, FIG. 4 depicts common structures used in the pusher plane: a fuselage 352, two horizontal wings 354, vertical stabilizers 356, and a propulsion unit 358, which can include a motor, shaft, and propeller.

UAVs can be launched in various ways, using various types of launch systems. A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide remote medical support. Such vehicles may include, for example, unmanned ground vehicles (UGVs), unmanned space vehicles (USVs), and/or unmanned underwater vehicles (UUVs). A UGV may be a vehicle, which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

III. ILLUSTRATIVE UAV SYSTEMS

Figure 5:
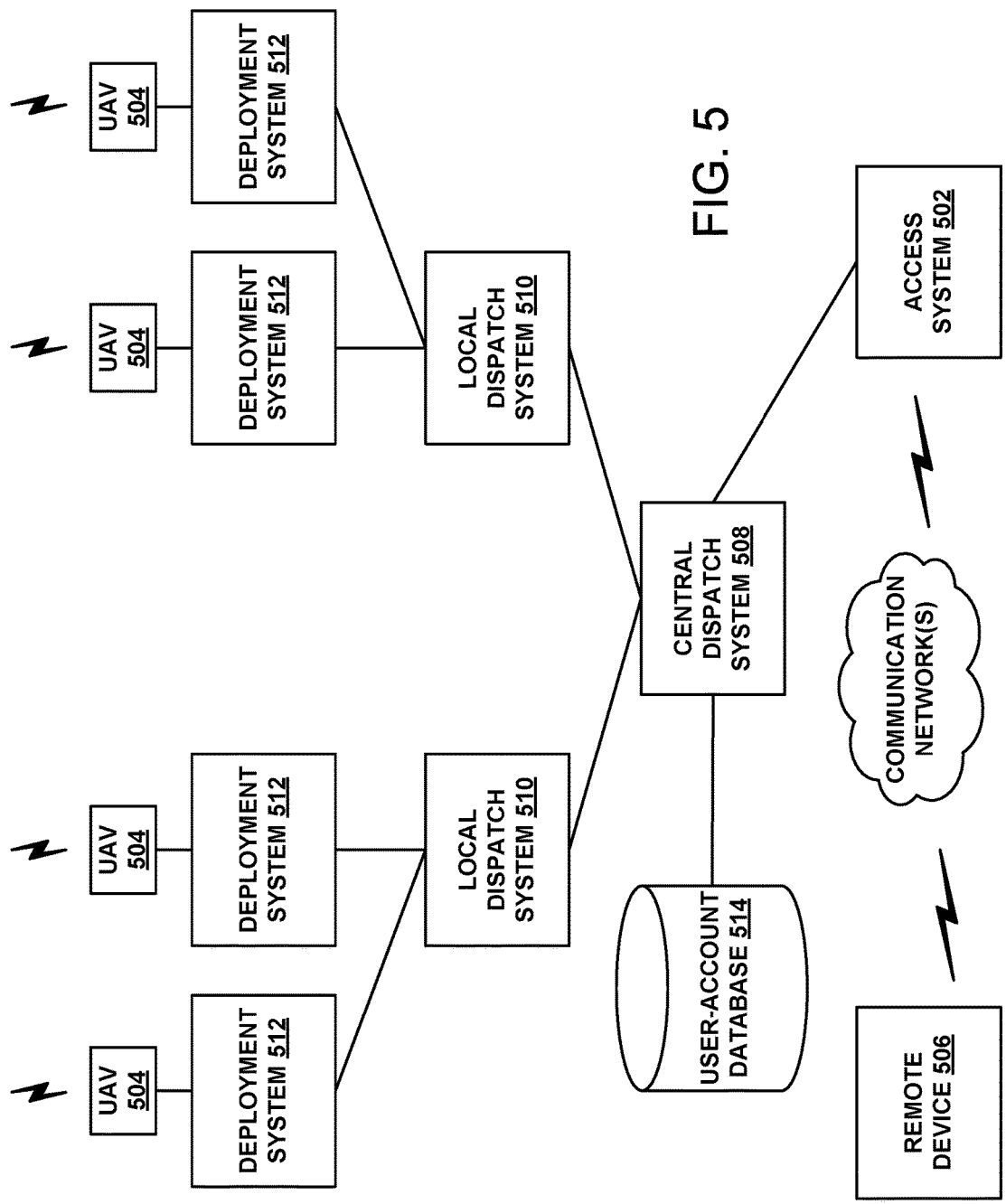
FIG. 5 is a simplified block diagram illustrating a UAV system, according to an example embodiment.

UAV systems may be implemented in order to provide various services. In particular, UAVs may be provided at a number of different launch sites, which may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to deliver various items to locations throughout the geographic area. As another example, a distributed UAV system may be provided in order to provide remote medical support, via UAVs. FIG. 5 is a simplified block diagram illustrating a distributed UAV system 500, according to an example embodiment.

In an illustrative UAV system 500, an access system 502 may allow for interaction with, control of, and/or utilization of a network of UAVs 504. In some embodiments, an access system 502 may be a computing system that allows for human-controlled dispatch of UAVs 504. As such, the control system may include or otherwise provide a user interface (UI) 503 via which a user can access and/or control UAVs 504. In some embodiments, dispatch of UAVs 504 may additionally or alternatively be accomplished via one or more automated processes.

Further, an access system 502 may provide for remote operation of a UAV. For instance, an access system 502 may allow an operator to control the flight of a UAV via user interface (UI). As a specific example, an operator may use an access system to dispatch a UAV 504 to deliver a package to a target location, or to travel to the location of a medical situation with medical-support items. The UAV 504 may then autonomously navigate to the general area of the target location. At this point, the operator may use the access system 502 to take over control of the UAV 504, and navigate the UAV to the target location (e.g., to a particular person to whom a package is being sent). Other examples of remote operation of a UAV are also possible.

In an illustrative embodiment, UAVs 504 may take various forms. For example, each UAV 504 may be a UAV such as those illustrated in FIGS. 1, 2, 3, and 4. However, medical support system 500 may also utilize other types of UAVs without departing from the scope of the invention. In some implementations, all UAVs 504 may be of the same or a similar configuration. However, in other implementations, UAVs 504 may include a number of different types of UAVs. For instance, UAVs 504 may include a number of types of UAVs, with each type of UAV being configured for a different type or types of medical support.

A remote device 506 may take various forms. Generally, a remote device 506 may be any device via which a direct or indirect request to dispatch UAV can be made. (Note that an indirect request may involve any communication that may be responded to by dispatching a UAV; e.g., requesting a package delivery, or sending a request for medical support). In an example embodiment, a remote device 506 may be a mobile phone, tablet computer, laptop computer, personal computer, or any network-connected computing device. Further, in some instances, remote device 506 may not be a computing device. As an example, a standard telephone, which allows for communication via plain old telephone service (POTS), may serve as a remote device 506. Other types of remote devices are also possible.

Further, a remote device 506 may be configured to communicate with access system 502 via one or more types of communication network(s) 514. For example, a remote device 506 could communicate with access system 502 (or via a human operator of the access system) by placing a phone call over a POTS network, a cellular network, and/or a data network such as the Internet. Other types of networks may also be utilized.

In some embodiments, a remote device 506 may be configured to allow a user to request delivery of one or more items to a desired location. For example, a user could request UAV delivery of a package to their home via their mobile phone, tablet, or laptop. As another example, a user could request dynamic delivery to whatever location they are at the time of delivery. To provide such dynamic delivery, a UAV system 500 may receive location information (e.g., GPS coordinates, etc.) from the user's mobile phone, or any other device on the user's person, such that a UAV can navigate to the user's location (as indicated by their mobile phone).

In some embodiments, a remote device 506 may be configured to allow a user to request medical support. For example, a person may use their mobile phone, a POTS phone, or a VoIP phone, to place an emergency call (e.g., a 9-1-1 call) and request that medical support be provided at the scene of an accident. Further, note that a request for medical support need not be explicit. For instance, a person may place a 9-1-1 call to report an emergency situation. When the 9-1-1 operator receives such a call, the operator may evaluate the information that is provided and decide that medical support is appropriate. Accordingly, the operator may use an access system 502 to dispatch a UAV 504.

As noted, a remote device 506 may be configured to determine and/or provide an indication of its own location. For example, remote device 506 may include a GPS system so that it can include GPS location information (e.g., GPS coordinates) in a communication to an access system 502 and/or to a dispatch system such as central dispatch system 508. As another example, a remote device 506 may use a technique that involves triangulation (e.g., between base stations in a cellular network) to determine its location. Alternatively, another system such as a cellular network may use a technique that involves triangulation to determine the location of a remote device 506, and then send a location message to the remote device 506 to inform the remote device of its location. Other location-determination techniques are also possible.

In an illustrative arrangement, central dispatch system 508 may be a server or group of servers, which is configured to receive dispatch messages requests and/or dispatch instructions from an access system 502. Such dispatch messages may request or instruct the central dispatch system 508 to coordinate the deployment of UAVs to various target locations. A central dispatch system 508 may be further configured to route such requests or instructions to local dispatch systems 510. To provide such functionality, central dispatch system 508 may communicate with access system 502 via a data network, such as the Internet or a private network that is established for communications between access systems and automated dispatch systems.

In the illustrated configuration, central dispatch system 508 may be configured to coordinate the dispatch of UAVs 504 from a number of different local dispatch systems 510. As such, central dispatch system 508 may keep track of which UAVs 504 are located at which local dispatch systems 510, which UAVs 504 are currently available for deployment, and/or which services or operations each of the UAVs 504 is configured for (in the event that a UAV fleet includes multiple types of UAVs configured for different services and/or operations). Additionally or alternatively, each local dispatch system 510 may be configured to track which of its associated UAVs 504 are currently available for deployment, and/or to track which services or operations each of its associated UAVs is configured for.

In some cases, when central dispatch system 508 receives a request for UAV-related service from an access system 502, central dispatch system 508 may select a specific UAV 504 to dispatch. The central dispatch system 508 may accordingly instruct the local dispatch system 510 that is associated with the selected UAV to dispatch the selected UAV. The local dispatch system 510 may then operate its associated deployment system 512 to launch the selected UAV. In other cases, a central dispatch system 508 may forward a request for a UAV-related service to a local dispatch system 510 that is near the location where the support is requested, and leave the selection of a particular UAV 504 to the local dispatch system 510.

In some embodiments, each deployment system 512 may take the form of a nest or possibly multiple nests, such as the illustrative nests described herein. Alternatively, a each nest could include one or more deployment systems 512. In other configurations, a nest may include or provide some or all of the functionality of a local dispatch system 510 and/or a central dispatch system 508. It should be understood, however, that a nest may additionally or alternatively provide other functionality and/or include other systems.

In an example configuration, a local dispatch system 510 may be implemented in a computing system at the same location as the deployment system or systems 512 that it controls. For example, in some embodiments, a local dispatch system 510 could be implemented by a computing system at a building, such as a fire station, where the deployment systems 512 and UAVs 504 that are associated with the particular local dispatch system 510 are also located. In other embodiments, a local dispatch system 510 could be implemented at a location that is remote to its associated deployment systems 512 and UAVs 404.

Numerous variations on and alternatives to the illustrated configuration of medical support system 500 are possible. For example, in some embodiments, a user of a remote device 506 could request medical support directly from a central dispatch system 508. To do so, an application may be implemented on a remote device 506 that allows the user to provide information regarding a requested service, and generate and send a data message to request that the UAV system provide the service. In such an embodiment, central dispatch system 508 may include automated functionality to handle requests that are generated by such an application, evaluate such requests, and, if appropriate, coordinate with an appropriate local dispatch system 510 to deploy a UAV.

Further, in some implementations, some or all of the functionality that is attributed herein to central dispatch system 508, local dispatch system(s) 510, access system 502, and/or deployment system(s) 512 could be combined in a single system, implemented in a more complex system, and/or redistributed among central dispatch system 508, local dispatch system(s) 510, access system 502, and/or deployment system(s) 512 in various ways.

Yet further, while each local dispatch system 510 is shown as having two associated deployment systems, a given local dispatch system 510 may have more or less associated deployment systems. Similarly, while central dispatch system 508 is shown as being in communication with two local dispatch systems 510, a central dispatch system may be in communication with more or less local dispatch systems 510.

In a further aspect, a deployment system 512 may take various forms. In general, a deployment system may take the form of or include a system for physically launching a UAV 504. Such a launch system may include features that allow for a human-assisted UAV launch and/or features that provide for an automated UAV launch. Further, a deployment system 512 may be configured to launch one particular UAV 504, or to launch multiple UAVs 504.

A deployment system 512 may further be configured to provide additional functions, including for example, diagnostic-related functions such as verifying system functionality of the UAV, verifying functionality of devices that are housed within a UAV (e.g., such as a defibrillator, a mobile phone, or an HIVID), and/or maintaining devices or other items that are housed in the UAV (e.g., by charging a defibrillator, mobile phone, or HIVID, or by checking that medicine has not expired).

In some embodiments, the deployment systems 512 and their corresponding UAVs 504 (and possibly associated local dispatch systems 510) may be strategically distributed throughout an area such as a city. For example, deployment systems 512 may be located on the roofs of certain municipal buildings, such as fire stations, which can thus serve as the dispatch locations for UAVs 504. Fire stations may function well for UAV dispatch, as fire stations tend to be distributed well with respect to population density, their roofs tend to be flat, and the use of firehouse roofs as leased spaces for UAV dispatch could further the public good. However, deployment systems 512 (and possibly the local dispatch systems 510) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, a UAV system 500 may include or have access to a user-account database 514. The user-account database 514 may include data for a number of user-accounts, and which are each associated with one or more person. For a given user-account, the user-account database 514 may include data related to or useful in providing UAV-related services. Typically, the user data associated with each user-account is optionally provided by an associated user and/or is collected with the associated user's permission.

Further, in some embodiments, a person may have to register for a user-account with the UAV system 500 in order to use or be provided with UAV-related services by the UAVs 504 of medical-support system 500. As such, the user-account database 514 may include authorization information for a given user-account (e.g., a user-name and password), and/or other information that may be used to authorize access to a user-account.

In some embodiments, a person may associate one or more of their devices with their user-account, such that they can be provided with access to the services of UAV system 500. For example, when a person uses an associated mobile phone to, e.g., place a call to an operator of access system 402 or send a message requesting a UAV-related service to a dispatch system, the phone may be identified via a unique device identification number, and the call or message may then be attributed to the associated user-account. Other examples are also possible.

IV. ILLUSTRATIVE COMPONENTS OF A UAV

Figure 6:
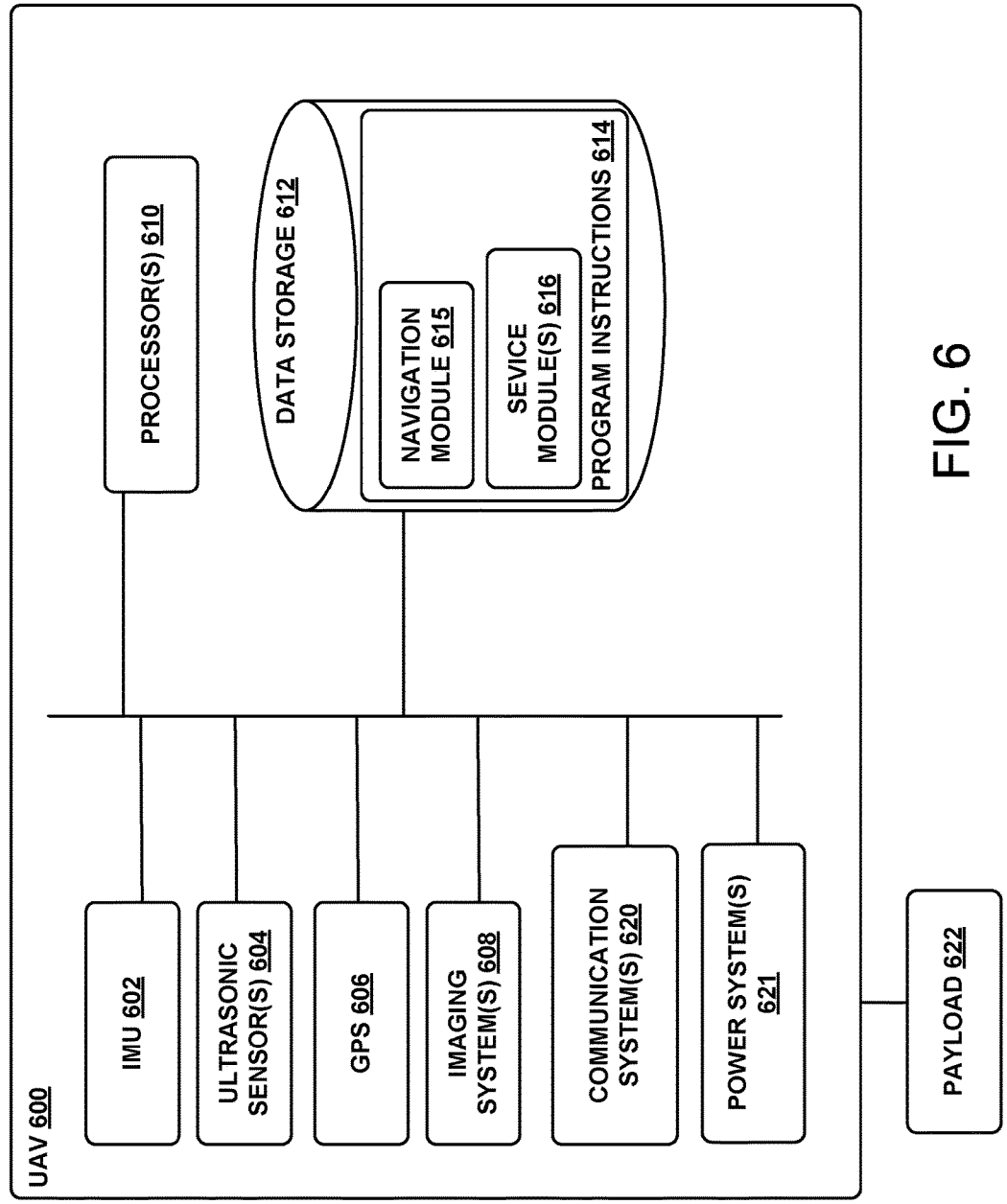
FIG. 6 is a simplified block diagram illustrating components of an unmanned aerial vehicle, according to an example embodiment.

FIG. 6 is a simplified block diagram illustrating components of a UAV 600, according to an example embodiment.

UAV 600 may take the form of, or be similar in form to, one of the UAVs 100, 200, 300, and 350 described in reference to FIGS. 1, 2, 3, and 4. However, a UAV 600 may also take other forms.

UAV 600 may include various types of sensors, and may include a computing system configured to provide the functionality described herein. In the illustrated embodiment, the sensors of UAV 600 include an inertial measurement unit (IMU) 602, ultrasonic sensor(s) 604, GPS 606, imaging system(s) 608, among other possible sensors and sensing systems.

In the illustrated embodiment, UAV 600 also includes one or more processors 610. A processor 610 may be a general-purpose processor or a special purpose processor (e.g., digital signal processors, application specific integrated circuits, etc.). The one or more processors 610 can be configured to execute computer-readable program instructions 614 that are stored in the data storage 612 and are executable to provide the functionality of a UAV described herein.

The data storage 612 may include or take the form of one or more computer-readable storage media that can be read or accessed by at least one processor 610. The one or more computer-readable storage media can include volatile and/or non-volatile storage components, such as optical, magnetic, organic or other memory or disc storage, which can be integrated in whole or in part with at least one of the one or more processors 610. In some embodiments, the data storage 612 can be implemented using a single physical device (e.g., one optical, magnetic, organic or other memory or disc storage unit), while in other embodiments, the data storage 612 can be implemented using two or more physical devices.

As noted, the data storage 612 can include computer-readable program instructions 614 and perhaps additional data, such as diagnostic data of the UAV 600. As such, the data storage 614 may include program instructions to perform or facilitate some or all of the UAV functionality described herein. For instance, in the illustrated embodiment, program instructions 614 include a navigation module 615 and one or more service modules 616.

A. Sensors

In an illustrative embodiment, IMU 602 may include both an accelerometer and a gyroscope, which may be used together to determine the orientation of the UAV 600. In particular, the accelerometer can measure the orientation of the vehicle with respect to earth, while the gyroscope measures the rate of rotation around an axis. IMUs are commercially available in low-cost, low-power packages. For instance, an IMU 602 may take the form of or include a miniaturized MicroElectroMechanical System (MEMS) or a NanoElectroMechanical System (NEMS). Other types of IMUs may also be utilized.

An IMU 602 may include other sensors, in addition to accelerometers and gyroscopes, which may help to better determine position and/or help to increase autonomy of the UAV 600. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 600, slight errors in measurement may compound over time and result in a more significant error. However, an example UAV 600 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 600 may also include a pressure sensor or barometer, which can be used to determine the altitude of the UAV 600. Alternatively, other sensors, such as sonic altimeters or radar altimeters, can be used to provide an indication of altitude, which may help to improve the accuracy of and/or prevent drift of an IMU.

In a further aspect, UAV 600 may include one or more sensors that allow the UAV to sense objects in the environment. For instance, in the illustrated embodiment, UAV 600 includes ultrasonic sensor(s) 604. Ultrasonic sensor(s) 604 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 600 also includes a GPS receiver 606. The GPS receiver 606 may be configured to provide data that is typical of well-known GPS systems, such as the GPS coordinates of the UAV 600. Such GPS data may be utilized by the UAV 600 for various functions. As such, the UAV may use its GPS receiver 606 to help navigate to the caller's location, as indicated, at least in part, by the GPS coordinates provided by their mobile device. Other examples are also possible.

UAV 600 may also include one or more imaging system(s) 608. For example, one or more still and/or video cameras may be utilized by a UAV 600 to capture image data from the UAV's environment. As a specific example, charge-coupled device (CCD) cameras or complementary metal-oxide-semiconductor (CMOS) cameras can be used with unmanned vehicles. Such imaging sensor(s) 608 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 600 may use its one or more imaging system 608 to help in determining location. For example, UAV 600 may capture imagery of its environment and compare it to what it expects to see in its environment given current estimated position (e.g., its current GPS coordinates), and refine its estimate of its position based on this comparison.

In a further aspect, UAV 600 may include one or more microphones. Such microphones may be configured to capture sound from the UAVs environment.

B. Navigation and Location Determination

The navigation module 615 may provide functionality that allows the UAV 600 to, e.g., move about in its environment and reach a desired location. To do so, the navigation module 615 may control the altitude and/or direction of flight by controlling the mechanical features of the UAV that affect flight (e.g., rotors 110 of UAV 100).

In order to navigate the UAV 600 to a target location, a navigation module 615 may implement various navigation techniques, such as map-based navigation and localization-based navigation, for instance. With map-based navigation, the UAV 600 may be provided with a map of its environment, which may then be used to navigate to a particular location on the map. With localization-based navigation, the UAV 600 may be capable of navigating in an unknown environment using localization. Localization-based navigation may involve a UAV 600 building its own map of its environment and calculating its position within the map and/or the position of objects in the environment. For example, as a UAV 600 moves throughout its environment, the UAV 600 may continuously use localization to update its map of the environment. This continuous mapping process may be referred to as simultaneous localization and mapping (SLAM). Other navigation techniques may also be utilized.

In some embodiments, the navigation module 615 may navigate using a technique that relies on waypoints. In particular, waypoints are sets of coordinates that identify points in physical space. For instance, an air-navigation waypoint may be defined by a certain latitude, longitude, and altitude. Accordingly, navigation module 615 may cause UAV 600 to move from waypoint to waypoint, in order to ultimately travel to a final destination (e.g., a final waypoint in a sequence of waypoints).

In a further aspect, navigation module 615 and/or other components and systems of UAV 600 may be configured for "localization" to more precisely navigate to the scene of a medical situation. More specifically, it may be desirable in certain situations for a UAV to be close to the person to whom an item is being delivered by a UAV (e.g., within reach of the person). To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, a UAV 600 may navigate to the general area of a person to whom an item is being delivered using waypoints. Such way paints may be predetermined based on GPS coordinates provided by a remote device at the target delivery location. The UAV may then switch to a mode in which it utilizes a localization process to locate and travel to a specific location of the person in need. For instance, if a person is having a heart attack at a large stadium, a UAV 600 carrying a medical package may need to be within reach of the person or someone near the person so that the can take items from the package. However, a GPS signal may only get a UAV so far, e.g., to the stadium. A more precise location-determination technique may then be used to find the specific location of the person within the stadium.

Various types of location-determination techniques may be used to accomplish localization of a person or a device once a UAV 600 has navigated to the general area of the person or device. For instance, a UAV 600 may be equipped with one or more sensory systems, such as, for example, imaging system(s) 608, a directional microphone array (not shown), ultrasonic sensors 604, infrared sensors (not shown), and/or other sensors, which may provide input that the navigation module 615 utilizes to navigate autonomously or semi-autonomously to the specific location of a person.

As another example, once the UAV 600 reaches the general area of a target delivery location (or of a moving subject such as a person or their mobile device), the UAV 600 may switch to a "fly-by-wire" mode where it is controlled, at least in part, by a remote operator, who can navigate the UAV 600 to the specific location of the person in need. To this end, sensory data from the UAV 600 may be sent to the remote operator to assist them in navigating the UAV to the specific location. For example, the UAV 600 may stream a video feed or a sequence of still images from the UAV's imaging system(s) 608. Other examples are possible.

As yet another example, the UAV 600 may include a module that is able to signal to a passer-by for assistance in either reaching the specific target delivery location; for example, a UAV may displaying a visual message requesting such assistance in a graphic display, play an audio message or tone through speakers to indicate the need for such assistance, among other possibilities. Such a visual or audio message might indicate that assistance is needed in delivering the UAV 600 to a particular person or a particular location, and might provide information to assist the passer-by in delivering the UAV 600 to the person or location (e.g., a description or picture of the person or location, and/or the person or location's name), among other possibilities. Such a feature can be useful in a scenario in which the UAV is unable to use sensory functions or another location-determination technique to determine the specific location of the person. However, this feature is not limited to such scenarios.

In some embodiments, once a UAV 600 arrives at the general area of a person who requested service and/or at the general area that includes a target delivery location, the UAV may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "Help! I'm over here!" to source the specific location of the person in need of medical assistance.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., rotors 110 of UAV 100) in order to effectuate such movements. The remote computing system may then communicate such adjustments to the UAV so it can move in the determined manner.

C. Communication Systems

In a further aspect, UAV 600 includes one or more communication systems 620. The communications systems 620 may include one or more wireless interfaces and/or one or more wireline interfaces, which allow UAV 600 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 600 may include communication systems 620 that allow for both short-range communication and long-range communication. For example, the UAV 600 may be configured for short-range communications using Bluetooth and for long-range communications under a CDMA protocol. In such an embodiment, the UAV 600 may be configured to function as a "hot spot;" or in other words, as a gateway or proxy between a remote support device and one or more data networks, such as cellular network and/or the Internet. Configured as such, the UAV 600 may facilitate data communications that the remote support device would otherwise be unable to perform by itself.

For example, UAV 600 may provide a WiFi connection to a remote device, and serve as a proxy or gateway to a cellular service provider's data network, which the UAV might connect to under an LTE or a 3G protocol, for instance. The UAV 600 could also serve as a proxy or gateway to a high-altitude balloon network, a satellite network, or a combination of these networks, among others, which a remote device might not be able to otherwise access.

D. Power Systems

In a further aspect, UAV 600 may include power system(s) 621. A power system 621 may include one or more batteries for providing power to the UAV 600. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

A UAV 600 may employ various systems and configurations in order to transport items. In the illustrated embodiment, a payload 622 may serve as a compartment that can hold one or more items, such that a UAV 600 can deliver the one or more items to a target delivery location. For example, as shown in FIG. 1, a UAV 100 can include a compartment 135, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible.

In some implementations, the payload 622 of a given UAV 600 may include or take the form of a "package" designed to transport medical-support items to a target delivery location. For example, a medical-support UAV may include a package with one or more items for medical support in the particular medical situation, and/or one or more medical-support modules 616 that are designed to provide medical support in the particular medical situation. In some cases, a UAV 600 may include a package that is designed for a particular medical situation such as choking, cardiac arrest, shock, asthma, drowning, etc. In other cases, a UAV 600 may include a package that is designed for a number of different medical situations, which may be associated in some way.

Such medical support items may aid in diagnosing and/or treating a person who needs medical assistance, or may serve other purposes. Example of medical-support items include, but are not limited to: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HIVID), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 621 for power.

In some embodiments, a UAV 600 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, a UAV 600 might function as a mobile defibrillator. Specifically, rather than carry a stand-alone defibrillator that can then be removed from the UAV for use, the UAV itself may function as a defibrillator.

F. Service Modules

As noted above, UAV 600 may include one or more service modules 916. The one or more service modules 616 include software, firmware, and/or hardware that may help to provide or assist in the provision of the UAV-related services.

Configured as such, a UAV 600 may provide various types of service. For instance, a UAV 600 may have stored information that can be provided to a person or persons at the target location, in order to assist the person or persons in various ways. For example, a UAV may include a video or audio file with instructions for performing some task, which the UAV can play out to a person at the target location. As another example, a UAV may include an interactive program to assist a person at the target location in performing some task. For instance, a UAV may include an application that analyzes the person's speech to detect questions related to the medical situation and/or that provides a text-based interface via which the person can ask such questions, and then determines and provides answers to such questions.

In some embodiments, a UAV 600 may facilitate communication between a layperson and/or medical personnel at the scene and medical personnel at a remote location. As an example, a service module 616 may provide a user interface via which a person at the scene can use a communication system 620 of the UAV to communicate with an emergency medical technician at a remote location. As another example, the UAV 600 can unlock certain capabilities of a remote device, such as a mobile phone, which is near the UAV at the scene of a medical situation. Such capabilities may be inaccessible to a user of the remote device, unless the remote device is within a certain distance from the UAV such that the UAV can unlock the capabilities. For example, a UAV may send the remote device a security key that allows the remote device to establish a secure connection to communicate with medical personnel at a remote location. Other examples are also possible.

V. EXAMPLE CONTROL SYSTEM

Example implementations relate to a control system that facilitates feedback processes based on environment information received from one or more aerial vehicles, such as from the UAVs discussed above for instance. Also, the control system at issue may be a stand-alone control system, may be incorporated as part of at least one UAV (e.g., UAV 600), may be incorporated as part of at least one feedback system (e.g., the feedback system discussed below), may be incorporated as part of an access system (e.g., access system 502), may be incorporated as part of at least one remote device (e.g., remote device 506), may be incorporated as part of at least one dispatch system (e.g., central dispatch system 508 and/or local dispatch system 510), and/or may be incorporated as part of at least one deployment system (e.g., deployment system 512), among other possibilities. Moreover, when the control system is incorporated as part of a UAV, this UAV may itself be the UAV being operated as described herein and/or the UAV may be another UAV, among other options.

Regardless of the arrangement in which the control system is found, the control system may generally include one or more processors and data storage (e.g., a non-transitory computer readable medium). Also, the control system may include program instructions that are stored on the data storage and are executable by one or more of the processors to carry out various operations, such as those discussed herein. Moreover, the control system may take various forms. For instance, the control system may take the form of a chip set, a server system, a digital signal processor, a programmable logic controller, and/or a sampled-data system, among other possibilities.

With these arrangements, the control system may operate a UAV and/or a feedback system, among other entities. In doing so, the control system may transmit one or more commands, such as by way of one or more wired or wireless communication links.

More specifically, the control system may do so using at least one wireless communication interface that provide at least one wireless communication link.

A wireless link may include, for example, Bluetooth, NFC, IEEE 802.11(IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11). In other examples, the arrangement may include access points through which the various systems may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

Moreover, as the control system operates the UAV and/or the feedback system, the control system may do so according to one or more assistance modes. Example assistance modes are described in more detail below.

VI. ILLUSTRATIVE METHODS

Disclosed herein are example implementations for the control system to use environment information received from an aerial vehicle (e.g., a UAV) as basis to apply feedback processes to initiate feedback, such as via a feedback system. These feedback processes can be used to help users navigate the environment and/or to recognize obstacles in the environment, among other possibilities. To illustrate, consider FIG. 7 showing an example method for applying feedback processes based on environment information.

Figure 7:
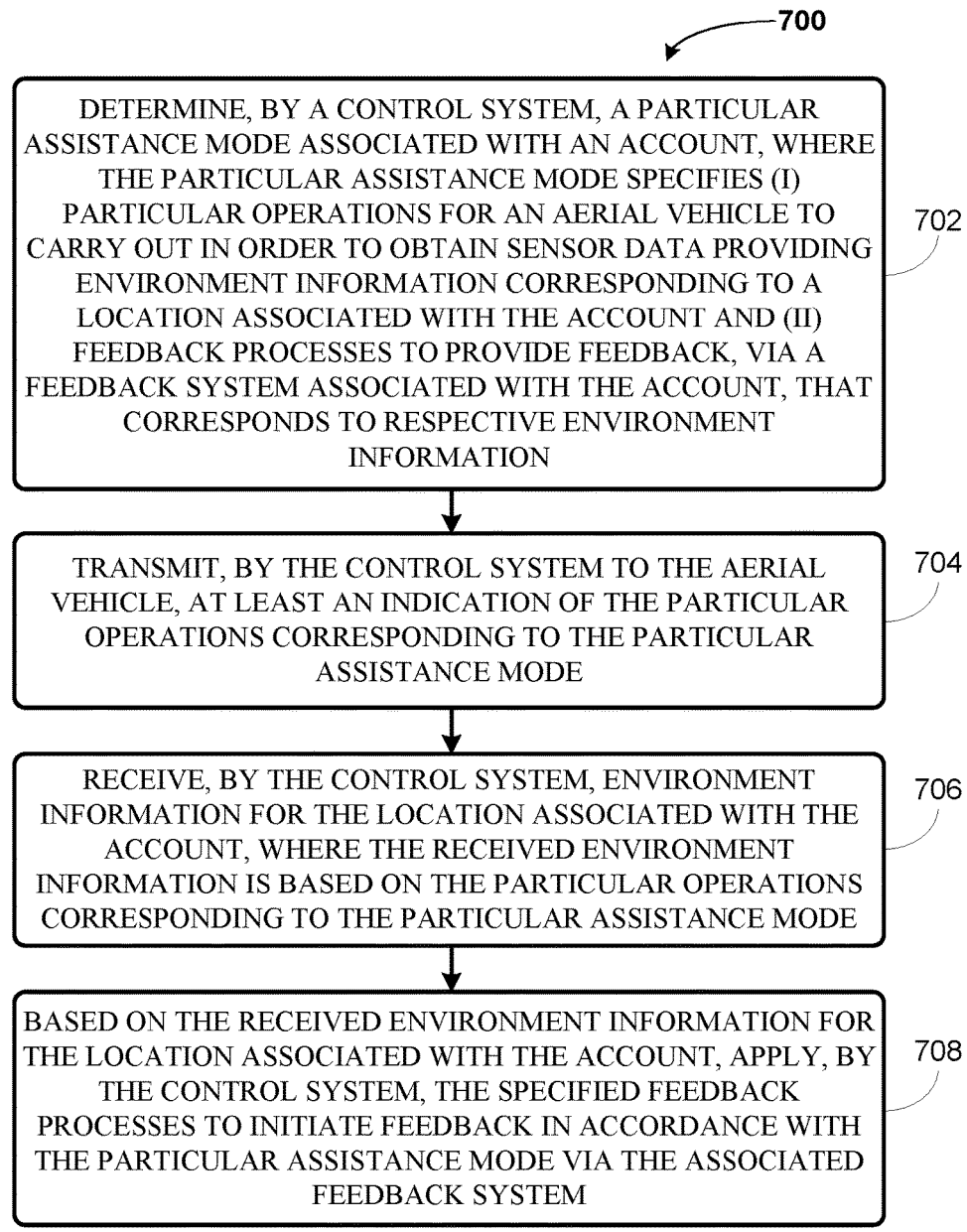
FIG. 7 is an example flowchart for providing feedback, according to an example embodiment.

FIG. 7 is a flowchart illustrating a method 700, according to an example implementation. Illustrative methods, such as method 700, may be carried out in whole or in part by a component or components in a control system, such as by the control system described above. However, it should be understood that example methods, such as method 700, may be carried out by other entities or combinations of entities (e.g., by other devices and/or combinations of devices), without departing from the scope of the disclosure.

It should be understood that for this and other processes and methods disclosed herein, flowcharts show functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

As shown by block 702, method 700 involves determining, by a control system, a particular assistance mode associated with an account, where the particular assistance mode specifies (i) particular operations for an aerial vehicle (e.g., a UAV) to carry out in order to obtain sensor data providing environment information corresponding to a location associated with the account and (ii) feedback processes to provide feedback, via a feedback system associated with the account, that corresponds to respective environment information.

In an example implementation, the control system may have stored thereon or may otherwise have access to information related to one or more user-accounts (for simplicity, could also be referred to as accounts). In particular, the control system may include or have access to a user-account database, such as user-account database 514 for instance or another user-account database. The user-account database at issue may include data for a number of user-accounts, and which are each associated with one or more people. Typically, the user data associated with each user-account is optionally provided by an associated user and/or is collected with the associated user's permission.

For a given user-account, the user-account database may include data related to or useful in providing services, such as assistance with tasks in the environment as further discussed below. And in some cases, a person may have to register for a user-account with the control system in order to use or be provided with such services. As such, the user-account database may include authorization information for a given user-account (e.g., a user-name and password), and/or other information that may be used to authorize access to a user-account. Furthermore, a person may associate one or more of their devices with their user-account, such that they can be provided with access to the services. For example, when a person uses an associated mobile phone to request assistance according to an assistance mode (e.g., by way of a call, message, and/or an application), the mobile phone may be identified via a unique device identification number, thereby attributing the request to the associated user-account. Other examples are also possible.

Further, the control system may also have stored thereon or may otherwise have access to information related to one or more assistance modes. An assistance mode may specify a set of operations that an aerial vehicle is to carry out as well as feedback processes used to provide feedback via a feedback system. Given these operations and processes, the assistance mode may assist a user of the disclosed system with various tasks. For example, a certain assistance mode may assist a visually-impaired user with navigation through the user's environment. In another example, another assistance mode may assist a hearing-impaired user with recognition of sounds in the user's environment. Various other examples are also possible.

More specifically, each assistance mode could be associated with a respective identifier. So when the control system refers to or otherwise specifies a particular assistance mode, the control system may simply refer to or otherwise specify the respective identifier associated with the particular assistance mode. Moreover, each such respective identifier may be mapped to the set of operation and feedback processes for the respective assistance mode. In this manner, the control system could have stored thereon or otherwise have access to mapping data that maps various assistance modes (e.g., various associated identifiers) to respective aerial vehicle operations, respective feedback processes, and/or other relevant respective information.

As noted, a given assistance mode may specify particular operations for an aerial vehicle to carry out in order to obtain sensor data providing environment information corresponding to a location associated with a given account. The location associated with the given account may be specified as part of the given account's user data and/or may be determined by the control system on an as-needed basis. For instance, the given account may specify a location, such as a global positioning system (GPS) location, an address, a city, and/or a neighborhood, among other possibilities (e.g., based on input data provided by the user). Additionally or alternatively, the control system could determine any such location in various ways, such as based on a current location (e.g., a determined GPS location) of a computing device (e.g., a mobile phone) associated with user-account, among other possibilities. Other instances are also possible.

In a further aspect, the specific aerial vehicle that carries out the operations may be determined in various ways. In one example, a specific aerial vehicle may be associated with the given account and thus may be specified as part of the given account's user data (e.g., based on input data provided by the user). In this example, the user represented by the given account may be the owner of the specific aerial vehicle or may otherwise have physical possession of the specific aerial vehicle, among other possibilities. Additionally or alternatively, the specific aerial vehicle associated with the given account could be part of a distributed UAV system (e.g., taking the same or similar form as distributed UAV system 500), which may allow for dispatch of the specific aerial vehicle (and perhaps other vehicles) so as to provide assistance in accordance with an assistance mode.

In another example, the aerial vehicle that is to carry out the operations may not necessarily be associated with the given account. Rather, the control system may determine an aerial vehicle that is currently positioned at a location that is within a threshold distance (and/or that is most proximate) to the location associated with the given account. In practice, the control system may do so based on evaluation of signal strength of a wireless signal received from a wireless signal emitter of the aerial vehicle or may do so in other ways. And once the control system does so, the control system may associate the determined aerial vehicle with the given account. As a result, the determined aerial vehicle may then ultimately carry out operations as described herein. Other examples are also possible.

As the aerial vehicle carries out the operations, the aerial vehicle may obtain sensor data using one or more of the aerial vehicle's sensors (e.g., any of the above-mentioned sensors). This sensor data may provide environment information representative of the location associated with the account. For example, the sensor data may include: (i) image data representative of the location, (ii) temperature data associated with the location, (iii) audio data associated with the location, (iv) data representative of movement(s) (e.g., speed of movement and/or direction of movement) of one or more entities within the location, and/or (v) position data associated with position of entities (e.g., objects) at the location. Other examples are also possible.

Given these arrangements, the set of operations may take various forms. For instance, the operations may specify one or more flight procedures that the aerial vehicle should carry out. These procedures may include a flight path, flight speed(s), and/or flight altitude, among others. Also, the operations may specify flight procedures that are based on the aerial vehicle's observations of the environment, such as flight procedures to carry out in response to detecting (e.g., based on sensor data) a certain movement within the environment. By way of example, if the aerial vehicle determines that a wearable feedback system (further described below) changes a direction of movement from a first direction to a second direction, then the procedure may specify that the aerial vehicle should also change the direction of movement from the first direction to the second direction. Other examples are also possible.

In another instance, the operations may specify one or more environment portions for which to obtain sensor data. In particular, these environment portions may be one or more areas within or in the vicinity of the location associated with the account. For example, if the location associated with the account is a specific neighborhood, then an environment portion may be a specific street within the specific neighborhood. And in another example, if the location associated with the account is a current GPS location, then an environment portion may be an area within a ten meter radius of the current GPS location. Various other examples are possible as well.

Furthermore, the operations may specify environment portions for which to obtain sensor that are based on the aerial vehicle's observations of the environment, such as by obtaining sensor data for specific environment portions in response to detecting (e.g., based on sensor data) certain movements within the environment. By way of example, if the aerial vehicle determines that a wearable feedback system changes direction of movement from a first direction to a second direction, then the operations may specify that the aerial vehicle should also adjust from (i) obtaining sensor data for a first area toward which the wearable feedback system is moving as the wearable feedback system moves in the first direction to (ii) obtaining sensor data for a second area toward which the wearable feedback system is moving as the wearable feedback system moves in the second direction. Other examples are also possible.

In yet another instance, the operations may specify one or more specific sensors with which to obtain sensor data. In particular, this may involve specification of one or more types of sensors, such as by specifying use of an image sensor and a position sensor for example. Additionally or alternatively, this may involve specifying selection of a sensor model and/or characteristics, such as by specifying a position sensor of a particular model for example. Moreover, the operations may specify that one or more specific sensors should be used in accordance with the aerial vehicle's observations of the environment, such as by specifying that specific sensors should be used in response to detecting (e.g., based on sensor data) certain movements within the environment. By way of example, if the aerial vehicle determines that a wearable feedback system changes speed of movement from a first speed to a second speed, then the operations may specify that the aerial vehicle should also adjust from using a first position sensor having a first refresh rate to using a second position sensor having a second refresh rate. Other instances and examples are also possible.

In an example implementation, each assistance mode specifies feedback processes to provide feedback, via a feedback system associated with the account, that corresponds to respective environment information. More specifically, the particular feedback system that is to provide the feedback may be determined in various ways. In one example, a particular feedback system may be associated with the given account and thus may be specified as part of the given account's user data (e.g., based on input data provided by the user). In this example, the user represented by the given account may be the owner of the particular feedback system or may otherwise have physical possession of the particular feedback system, among other possibilities.

In another example, the feedback system that is to provide feedback may not necessarily be associated with the given account. Rather, the control system may determine that a certain feedback system is currently positioned at a location that is within a threshold distance (and/or that is most proximate) to the location associated with the given account. In practice, the control system may do so based on evaluation of signal strength of a wireless signal received from a wireless signal emitter of the feedback system or may do so in other ways. And once the control system does so, the control system may associate the determined feedback system with the given account. As a result, the determined feedback system may then ultimately provide feedback as described herein. Other examples are also possible.

Figure 8:
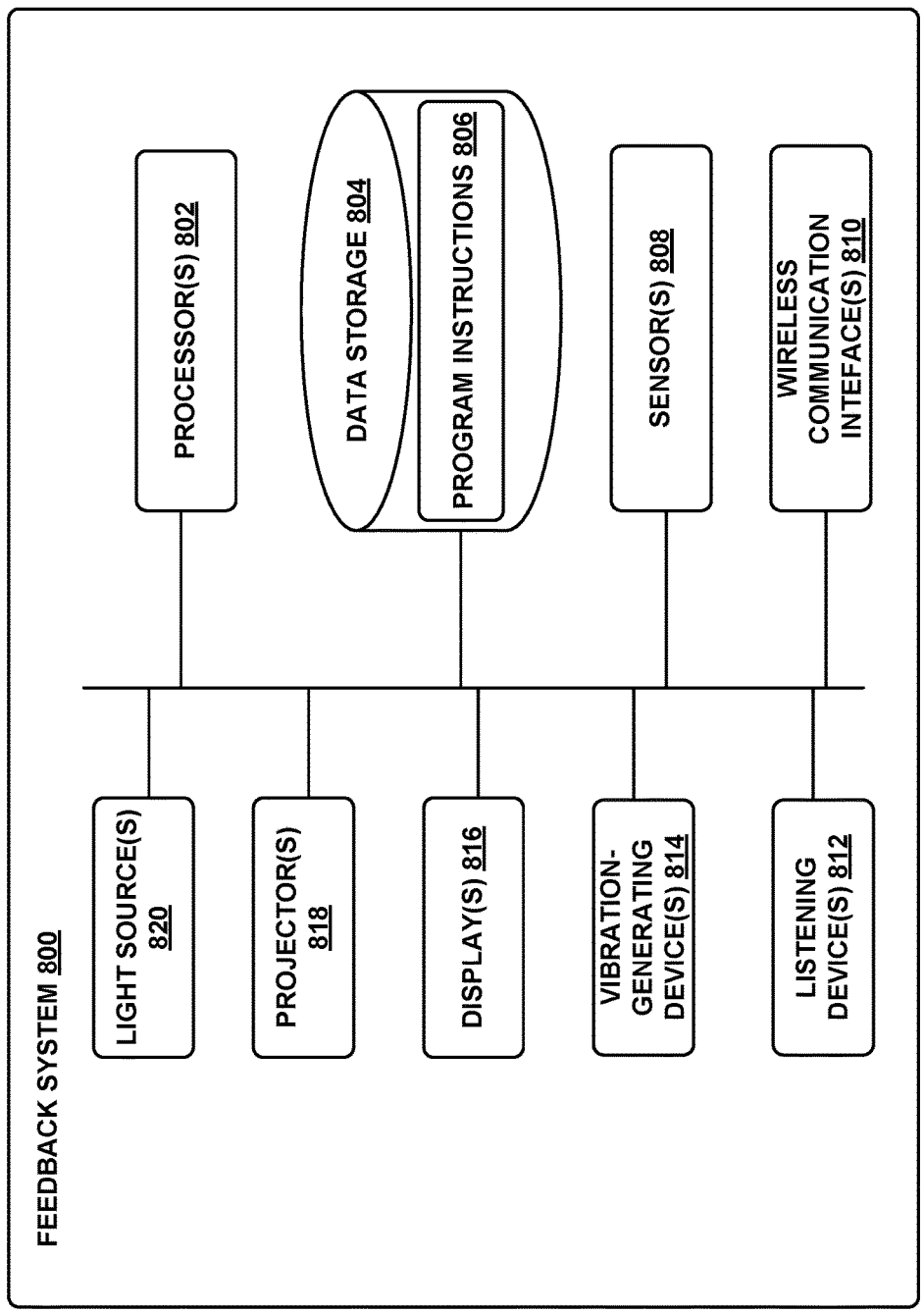
FIG. 8 is a simplified block diagram illustrating components of a feedback system, according to an example embodiment.

Regardless of how the feedback system is determined, the feedback system may include one or more components. In particular, FIG. 8 shows an example feedback system 800, which includes processor(s) 802, data storage 804, program instructions 806, sensor(s) 808, wireless communication interface(s) 810, listening device(s) 812, vibration-generating device(s) 814, display(s) 816, projector(s) 818, and light source(s) 820. Note that the feedback system 800 is shown for illustration purposes only and feedback system 800 may include additional components and/or have one or more components removed without departing from the scope of the disclosure. Further, note that the various components of feedback system 800 may be arranged and connected in any manner.

Moreover, the above description of processor(s), data storage, program instructions, sensors, and/or wireless communication interface(s) may apply to any discussion below relating to the respective component being used in another system or arrangements. For instance, as noted, FIG. 8 (among other possible figures) illustrates processors, data storage, program instructions, sensors, and/or wireless communication interface(s) as being incorporated in another arrangement. These components at issue may thus take on the same or similar characteristics (and/or form) as the respective components discussed above in association with FIG. 6. However, the components at issue could also take on other characteristics (and/or form) without departing from the scope of the disclosure.

In an example implementation, a listening device 812 may include any device configured to emit audio, such as vocal instructions, music, and/or other sounds. In practice, this listening device 812 could take the form of a speaker, headphones, and/or an assistive listening device, among others. Also, a vibration-generating device 814 may include any device that is configured to generate vibrations, such as an electric motor for instance. Additionally, a display 816 may include any device configured to present information in visual and/or tactile form, such as by presenting a graphical user interface (GUI) and/or by providing tactile feedback for instance. Further, a projector 818 may include any device that is configured to emit a projection onto a surface in the environment, thereby providing feedback in the form of projected light and/or projected images. Yet further, a light source 820 may include any device configured to emit light at varying intensities, colors, and/or patterns, among other light characteristics. In practice, light sources 820 may be light emitting diodes (LEDs) and/or light bulbs, among others. Other example feedback devices are possible as well.

Furthermore, a feedback system could take various forms. By way of example, a feedback system may take the form of a head-mountable device (HIVID) (e.g., including a display), a smartwatch, a vest, a suit, a clothing item, a helmet, headphones, a mobile device, shoulder pads, knee pads, or any combination thereof. Various other forms are possible as well without departing from the scope of the disclosure. To illustrate, refer to FIGS. 9A to 9C showing several example feedback systems.

Figure 9A:
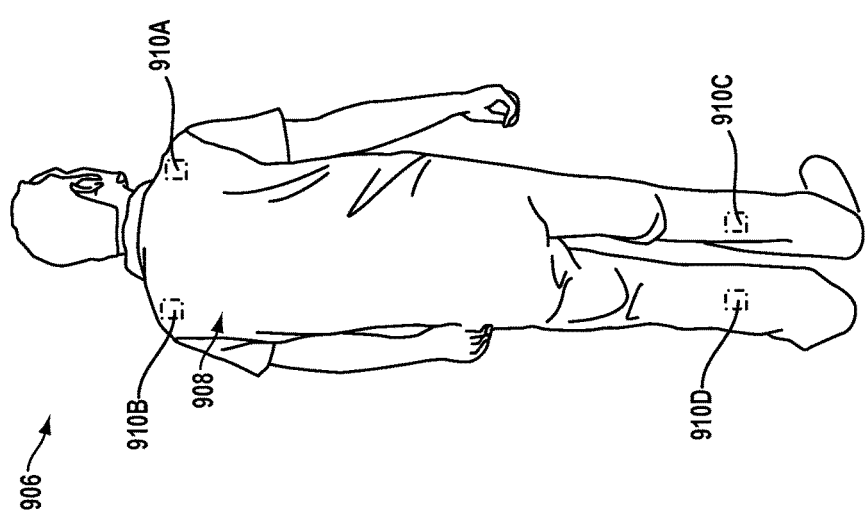
FIGS. 9A to 9C each illustrate a feedback system taking a respective form, according to an example embodiment.
Figure 9B:
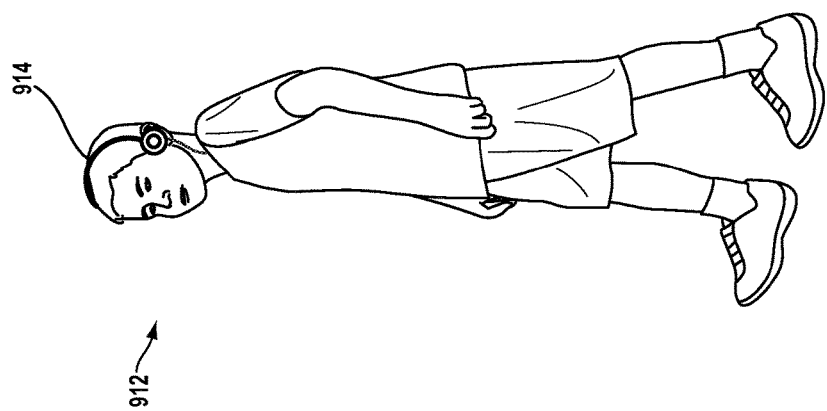
Figure 9C:
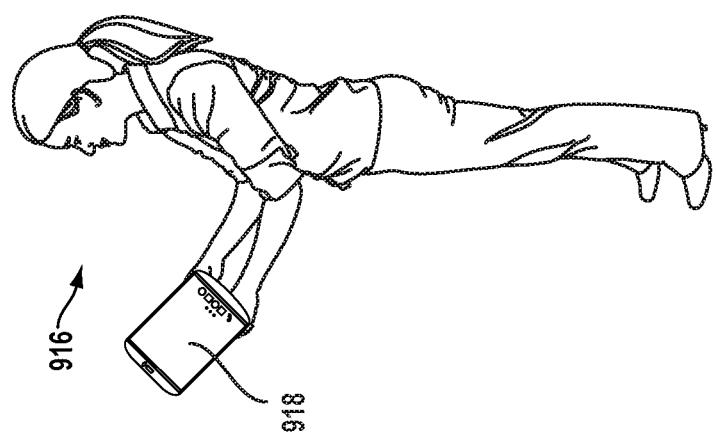

As shown in FIG. 9A, a user 906 may wear a full-body suit 908 including vibration-generating devices 910A to 910D embedded thereon. When the suit 908 is worn, vibration-generating device 910A is positioned near the user 906's right shoulder, vibration-generating device 910B is positioned near the user 906's left shoulder, vibration-generating device 910C is positioned near the user 906's right leg, and vibration-generating device 910D is positioned near the user 906's left leg. With this arrangement, the suit is configured to provide vibrational feedback that may be "felt" by the user 906 at one or more of those body portions. In yet another instance, as shown in FIG. 9B, a user 912 may wear headphones 914 that are configured to generate sound, which may ultimately be "heard" by the user 912. In yet another example, as shown in FIG. 9C, the feedback system may take the form of a computing device 918 that a user 916 may hold, place in the user 916's pocket, and/or otherwise maintain in the user 916's vicinity. Various other instances are possible as well.

When a feedback system includes or otherwise takes the form of a computing device, such as computing device 918 for instance, feedback processes may be initiated by the control system to provide feedback via the computing device. In some cases, however, these feedback processes may only be initiated when the computing device is relatively close to the user of the system. In particular, the control system may determine whether or not an associated computing device is located within a threshold distance (e.g., ten meters) away from the location associated with the account. And if the control system determines that the computing device is located within the threshold distance away from the location associated with the account, then the control system may be configured to responsively apply feedback processes to initiate feedback via the associated computing device and may do so as further discussed below.

Given such feedback arrangements, the control system may thus be configured to initiate feedback processes to provide feedback via a feedback system, such as via any of those described above. This feedback may take the form of auditory feedback, vibrational feedback, and/or visual feedback, among other possibilities. Moreover, as noted, each assistance mode may specify the respective feedback that should be provided, such as respective feedback that should be provided in response to the control system receiving or otherwise determining specific environment information.

For instance, the control system may refer to mapping data associated with the particular assistance mode through which assistance is being provided. This mapping data may map certain environment information to certain feedback processes. So when the control system receives specific environment information, the control system may responsively refer to the mapping data associated with the particular assistance to determine the particular feedback process that should be initiated. As an example, if the control system receives environment information that is representative of an obstacle being position to the left of the user 906, the control system may refer to the mapping data and determine that vibrational feedback should be provided via vibration-generating device 910B, which is positioned near the user 906's left shoulder. In some cases, however, different assistance modes may specify different feedback processes to be provided even if the same environment information is received. In this manner, each assistance mode may provide feedback suitable to the specific user of the system disclosed herein. Other examples and cases are also possible.

In an example implementation, the control system may be configured to determine the particular assistance mode associated with the given account. The control system may determine the particular assistance mode in various ways. For instance, user data in the given account may specify at least one respective identifier associated with a particular assistance mode. So the control system may be configured to determine a respective identifier indicated as part of the user data associated with the account and may thus determine the particular assistance mode based on the determined respective identifier.

In another instance, the control system may receive input data specifying the particular assistance mode, such as when a user provides input data via a GUI on a computing device for example. As such, the control system may determine the particular assistance mode based on such received input data. In some cases, the input data may specify a "default" assistance mode such that this assistance mode is indicated in the given account and is thus determined based on a respective identifier as discussed above. In other cases, the input data may specify a selection of a particular assistance mode from among a plurality of assistance modes, such as when a user selects a particular assistance mode from a drop-down menu listing a plurality of assistance modes for example. Other cases are possible as well.

As an example, the input data may specify a navigation assistance mode, which may assist a user with navigation through the environment. Moreover, the input data may include a request for navigation to a particular destination, such as to a particular address for example. So based on this input data, the control system may select or otherwise determine that the assistance mode to be applied is a navigation assistance mode. And the control system may arrange the navigation mode to specify a respective feedback process to provide feedback indicative of one or more navigation instructions, which may each specify at least one movement towards the particular destination. By way of example, the feedback may include projection from a projector of the feedback system. These projections may include projections of arrows each indicating an instructed direction of movement and perhaps may also include projections to point out obstacles and/or points of interest in the environment. Other examples are also possible.

Furthermore, in this instance, input data could also specify various other criteria based on which the control system may then arrange the particular assistance mode. In one case, the input data may include a request for a certain extent of feedback to be provided. For example, the input data may specify an extent of vibration to be provided by a certain vibration-generating device and/or may specify a light intensity to be provided by a certain light source, among other possibilities. In another case, the input data may include a request for a certain form of feedback to be provided. For example, the input data may include a request to provide only vibrational feedback without providing any other form of feedback. Other cases are possible as well.

In yet another instance, the control system may determine the particular assistance mode based on historical environment information. In particular, the control system may receive preceding environment information during one or more previous instances at which the control system carried out method 700. So based on at least a portion of the preceding environment information, the control system may determine the particular assistance mode. For example, the control system may determine that the preceding environment information is representative of a threshold high number of obstacles being encountered in the environment and may responsively determine that a "visual obstacle detection" assistance mode should be used, which is arranged to provide visual feedback to points out all obstacles that an aerial vehicle detect within a one mile radius of the location associated with the account.

Furthermore, in this instance, the control system may determine criteria for the particular assistance mode based on historical environment information and may arrange the particular assistance mode to operate in accordance with the determined criteria. In particular, the control system may use at least a portion of the preceding environment information as basis to determine an extent of feedback to be provided, such as by determining a frequency with which to provide feedback for instance. Also, the control system may use at least a portion of the preceding environment information as basis to determine one or more forms of feedback to be provided to be provided, such as by determining whether visual and/or vibrational feedback should be provided for instance.

By way of example, the control system may determine preceding environment information for a first account. In doing so, the control system may determine that this preceding environment information indicates twenty previous collisions with obstacles in the environment and may also determine that the indicated number of collisions exceeds a threshold number of collisions (e.g., fifteen). And in response to determining that the indicated number of collisions exceeds the threshold number of collisions, the control system may determine that the above-mentioned "visual obstacle detection" assistance mode should provide feedback periodically at periodic increments of ten seconds.

In contrast, the control system may also determine preceding environment information for a second account. In doing so, the control system may determine that this preceding environment information indicates ten previous collisions with obstacles in the environment and may also determine that the indicated number of collisions is less than the threshold number. Responsively, the control system may then determine that the above-mentioned "visual obstacle detection" assistance mode should provide feedback periodically at periodic increments of thirty seconds. In this manner, the control system may initiate feedback processes to provide feedback for the second account on a less frequent basis than the control system provides feedback for the first account. Other instances and examples are possible as well.

As shown by block 704, method 700 involves transmitting, by the control system to the aerial vehicle, at least an indication of the particular operations corresponding to the particular assistance mode.

Once the control system determines the particular assistance mode, the control system may transmit to the specific aerial vehicle an indication of the particular operations corresponding to the particular assistance mode. In one example, doing so may simply involve the control system transmitting to the specific aerial vehicle an identifier associated with the particular assistance mode. And once the specific aerial vehicle receives the identifier, the specific aerial vehicle may determine the particular assistance mode based on the received identifier. More specifically, the specific aerial vehicle may have stored thereon or may otherwise have access to information related to one or more assistance modes, which may include at least information representative of operations corresponding to each such assistance mode. With this arrangement, the specific aerial vehicle may determine the particular assistance mode and may refer to the information to determine the operations corresponding to the particular assistance mode, so as to then independently operate in accordance with these operations.

In another example, doing so may involve specifying in the indication the operations corresponding to the particular assistance mode. In particular, the control system may specify all the operations in a single indication and may then transmit the indication the specific aerial vehicle. Once the specific aerial vehicle receives the indication, the specific aerial vehicle could then refer to the operations on an as-needed basis, so that the specific aerial vehicle could operate independently in accordance with the specified operations.

Alternatively, the control system may transmit indications on an as-needed basis, each of which may specify one or more operations for the specific aerial vehicle to carry out in a time period following reception of the respective indication. And when specifying operation on an as-needed basis, the operations to be specified may be determined in various ways. For instance, the operations may be predetermined and may simply be sent in a certain order and perhaps in accordance with certain timing (e.g., periodically). And in another instance, the operations may be determined based on environment information that the control system receives. In this manner, the control system could inform the specific aerial vehicle of further operation to be carried out and may do so even after the control system already received some environment information as further discussed below in association with block 706 and/or after the control system already began applying feedback processes as further discussed below in association with block 708.

By way of example, environment information received from the specific aerial vehicle may specify that the feedback system associated with the account is currently stationary (e.g., a user stopped moving). Based on this received environment information, the control system may determine an operation involving hover flight at a spatial location that is above the current stationary location of the feedback system. As such, the control system may generate an indication specifying this operation and may then transmit the generated indication to the specific aerial vehicle. Once the specific aerial vehicle receives this indication, the specific aerial vehicle may then move to the location that is above the current stationary location of the feedback system and may then initiate hover flight at that location. Various other examples are also possible.

As shown by block 706, method 700 involves receiving, by the control system, environment information for the location associated with the account, where the received environment information is based on the particular operations corresponding to the particular assistance mode.

Once the specific aerial vehicle receives at least one indication of the particular operations corresponding to the particular assistance mode, the specific aerial vehicle may then operate in accordance with the specified operations. More specifically, the specific aerial vehicle may collect sensor data using one or more sensors and may do so in accordance with the specified operations. This sensor data may be representative of environment information corresponding to the location associated with the account. Accordingly, the control system may receive the environment information from the specific aerial vehicle. This environment information may be receives continuously (e.g., in real-time), periodically, and/or at other times.

Moreover, when the control system receives environment information, the control system could receive raw sensor data from the specific aerial vehicle. The raw sensor data may include any collected sensor data that has not been processed nor modified in any manner (e.g., by the specific aerial vehicle) before being transmitted to the control system. And based on the raw sensor data, the control system may then determine environment information related to the location associated with the account. Additionally or alternatively, the control system may receive modified sensor data from the specific aerial vehicle. The modified sensor data may include any collected sensor data that has been processed and/or modified in some manner (e.g., by the specific aerial vehicle) before being transmitted to the control system. For instance, the processor of a specific aerial vehicle may compress the collected sensor data, may remove portions of the collected sensor data, may add information to the collect sensor data, may combine sensor data collected from different sensors, and/or may separate sensor data collected from a single sensor, among other possibilities. As such, based on the modified sensor data, the control system may then determine environment information related to the location associated with the account.

Furthermore, the control system may sometimes receive environment information from one or more other systems. For instance, the control system may receive raw and/or modified sensor data from sensors (e.g., sensor(s) 808) of a feedback system associated with the account. In another instance, the control system may receive raw and/or modified sensor data from sensors of a different feedback system that is not necessarily associated with the account. In yet another instance, the control system may receive raw and/or modified sensor data from a different aerial vehicle that is not necessarily associated with the account. Various other instances are also possible.

As shown by block 708, method 700 involves, based on the received environment information for the location associated with the account, applying, by the control system, the specified feedback processes to initiate feedback in accordance with the particular assistance mode via the associated feedback system.

As the control system receives environment information, the control system may use the received environment information as a basis to determine one or more specified feedback processes to initiate feedback that should be applied by the associated feedback system. In particular, the control system may refer to the above-mentioned mapping data associated with the particular assistance mode through which assistance is being provided. As noted, this mapping data may map certain environment information to certain feedback processes. So when the control system receives specific environment information, the control system may responsively refer to the mapping data associated with the particular assistance to determine the particular feedback process that should be initiated.

Once control system determines the feedback process, the control system may engage in communication with the associated feedback system, so as to cause the associated feedback system to provide feedback in accordance with the feedback process. In one case, the control system may transmit to the associated feedback system an identifier associated with the feedback process. And once the associated feedback system receives the identifier, the associated feedback system may determine the particular feedback process based on the received identifier. More specifically, the associated feedback system may have stored thereon or may otherwise have access to information related to one or more feedback processes, which may include at least information representative of forms and/or types of feedback corresponding to each such feedback process. With this arrangement, the associated feedback system may determine the particular feedback process and may refer to the information to determine the specific forms and/or types of feedback corresponding to the particular feedback process, so as to then provide feedback in accordance with the particular feedback process. In another case, the control system may transmit to the associated feedback system an indication specifying the types and/or forms of feedback to be provided in accordance with the determined feedback process. Other cases are also possible.

In this manner, the control system may receive environment information over time and may responsively initiate various feedback processes over time. For instance, the control system may receive first environment information over a first time period and may responsively initiate a first corresponding feedback process over this first time period. And then over a second time period, the control system may receive second environment information (e.g., different than the first environment information) and may responsively initiate a second corresponding feedback process (e.g., different than the first feedback process) over this second time period. Other instances are also possible.

By way of example, the control system may receive from the specific aerial vehicle environment information for the location associated with the account. And based on this received environment information, the control system may determine that a particular obstacle is positioned at or in the vicinity of the location associated with the account. In doing so, the control system may determine a potential future contact with the particular obstacle, such as a potential future collision between the particular obstacle and a user wearing the associated feedback system for instance. As such, the control system may determine a corresponding feedback process to initiate feedback that indicates the potential future contact, so as to ultimately help the user avoid the future contact for instance.

Moreover, when the control system determines the potential future contact, the control system may determine specific factors related to this potential future contact. For instance, the control system use position information (or any other information) included in the received environment information to determine a distance between the particular obstacle and the location associated with the account (e.g., location of the user). And in another instance, the control system use movement information (or any other information) included in the received environment information to determine a time period until the potential future contact occurs.

Accordingly, the control system may arrange or otherwise determine the feedback process so as to initiate feedback that indicates one or more of these factors. For instance, the feedback may be arranged to indicate the distance between the particular obstacle and the location associated with the account. As an example, the control system may determine a feedback process to initiate vibrational feedback at a vibrational intensity corresponding to the determined distance. And the vibrational intensity may be set to proportionally increase as the distance between the particular obstacle and the location associated with the account becomes smaller. Further, in another instance, the feedback may be arranged to indicate the time period until the potential future contact occurs. As an example, the control system may determine a feedback process to initiate auditory feedback that includes a vocal phrase indicating the time period (e.g., "ten second until potential contact with the object"). Other instances and examples are also possible.

Figure 10A:
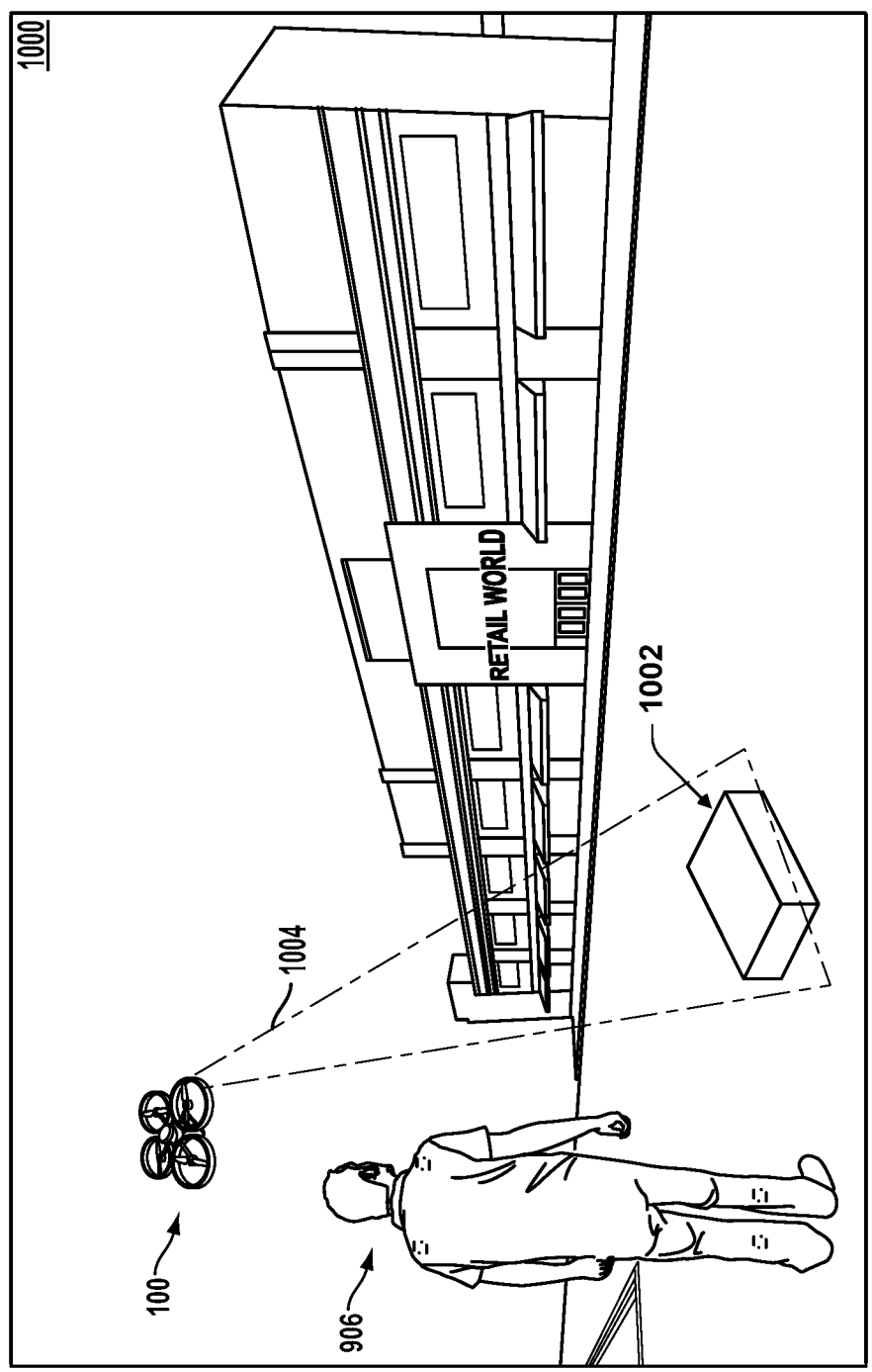
FIGS. 10A to 10B illustrate a scenario involving assistance being provided to a user, according to an example embodiment.
Figure 10B:
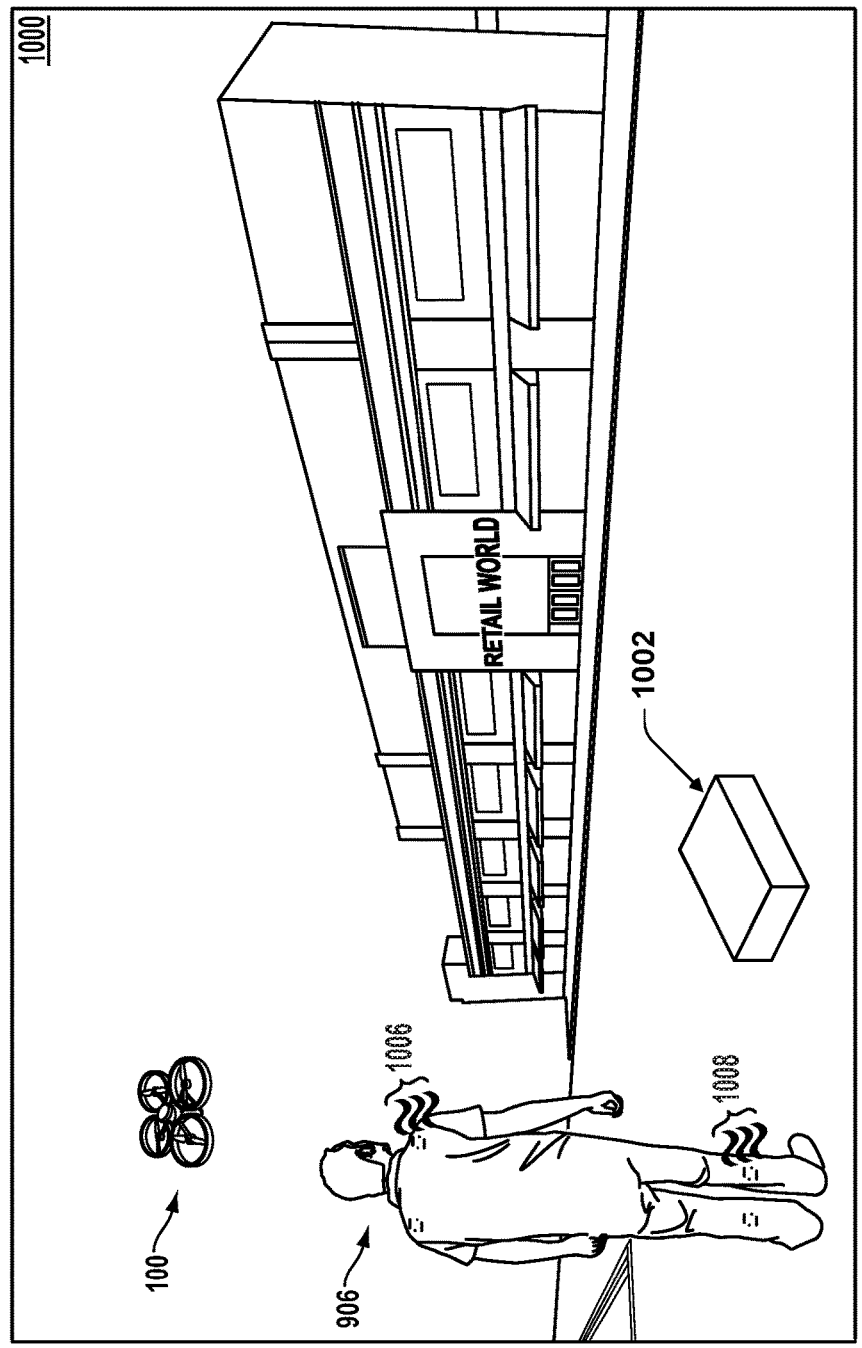

To illustrate, refer to FIGS. 10A to 10B showing an example scenario 1000 involving assistance to user 906. As shown in FIG. 10A, the user 906 is located nearby a "Retail World" store location and the disclosed system may provide, via a navigation mode for a visually-impaired user, assistance to the user 906 with navigation to the "Retail World" store location. And as further shown in FIG. 10A, rotorcraft 100 is obtaining sensor data 1004 for an environment portion in which an obstacle 1002 is located. The rotorcraft 100 may transmit the obtained sensor data 1004 to a control system. Then, the control system may use the sensor data 1004 to determine that the obstacle 1002 is position to the right of user 906.

Once the control system determines that the obstacle 1002 is position to the right of user 906, the control system may determine a feedback process to initiate feedback indicative of the position of the obstacle 1002 relative to the user 906. As shown in FIG. 10B, the control system causes the suit 908 worn by user 906 to provide vibrational feedback. In particular, the feedback process directs the suit 908 to provide vibrational feedback 1006 via the vibration-generating device 910A, which is positioned near the user 906's right shoulder when the suit 908 is worn. Also, the feedback process directs the suit 908 to provide vibrational feedback 1008 via the vibration-generating device 910C, which is positioned near the user 906's right leg when the suit 908 is worn. In this manner, the provided vibrational feedback 1006 and 1008 may be "felt" by the user 906 on the right portion of the user 906's body and the user 906 may then potentially be aware of the obstacle 1002 being positioned to the right of the user 906. Other illustrations are possible as well.

In some cases, when the control system determines a potential future contact with a particular obstacle, the control system may direct the specific aerial vehicle to move the particular object so as to help avoid the potential future contact. More specifically, the control system may instruct the specific aerial vehicle to move the particular obstacle to a different location and the specific aerial vehicle may do so any feasible manner, such as by grasping onto the particular obstacle with a gripper and then releasing the grasp once the particular obstacle has been move to the different location.

Moreover, the different location may be selected based on one or more factors, so as to avoid the potential future contact. For instance, the control system may determine a vector corresponding to the direction of movement of the associated feedback system and may determine that the particular obstacle is positioned at a location that overlaps with the determined vector. As such, the control system may select the different location based on the particular obstacle being positioned at a location that does not overlap with the determined vector. Other instances are also possible.

Furthermore, the control system may direct the specific aerial vehicle to move the particular object may be responsive to one or more detections. For instance, the control system may determine that the distance between the particular obstacle and the location associated with the account (e.g., location of the user) is less than a threshold distance (e.g., two meters) and may responsively direct the specific aerial vehicle to move the particular object as discussed above. And in another instance, the control system may determine that the time period until the potential future contact occurs is less than a threshold time period (e.g., five seconds) and may responsively direct the specific aerial vehicle to move the particular object as discussed above. Other instances are also possible.

In a further aspect, the present disclosure may be carried out in the context of two or more aerial vehicles that operate in accordance with a particular assistance mode so as to assist a single user. More specifically, the particular assistance mode may specify at least particular operations for a first aerial vehicle to carry out as well as particular operations for a second aerial vehicle to carry out. With this arrangement, once the control system determines the particular assistance mode, the control system may transmit to the first and second aerial vehicle respective indications of the particular operations corresponding to the particular assistance mode.

Then, the control system may receive certain environment information from the first aerial vehicle, which the first aerial vehicle may obtain in accordance with the corresponding operations specified in the particular assistance mode. Also, the control system may receive other environment information from the second aerial vehicle, which the second aerial vehicle may obtain in accordance with the corresponding operations specified in the particular assistance mode. As such, the control system may use both the environment information received from the first aerial vehicle as well as environment information received from the second aerial vehicle as basis for apply feedback processes to initiate feedback via the associated feedback system. Note that, as the first and second aerial vehicles operate in accordance with specified operations, these aerial vehicle may transmit information to one another, such as location information in order to avoid collision with one another for instance.

By way of example, the particular assistance mode may be arranged to specify that the first aerial vehicle should obtain environment information for an environment portion that is to the right of the location associated with the account and may also specify that the second aerial vehicle should obtain environment information for an environment portion that is to the left of the location associated with the account. As the first and second aerial vehicles operate according to the particular assistance mode, the control system may receive the respective environment information from the aerial vehicles.

Accordingly, based on the environment information received from the first aerial vehicle, the control system may determine that a first obstacle is positioned two meters to the right of the location associated with the account and may responsively determine a feedback process to initiate feedback indicative of the first obstacle being positioned two meters to the right of the location associated with the account. And based on the environment information received from the second aerial vehicle, the control system may determine that a second obstacle is positioned four meters to the left of the location associated with the account and may responsively determine a feedback process to initiate feedback indicative of the second obstacle being positioned four meters to the left of the location associated with the account. Other examples are also possible.

In yet a further aspect, the present disclosure may be carried out in the context of a single aerial vehicle that operates in accordance with a particular assistance mode so as to assist two or more users. More specifically, the control system may be arranged to determine a first assistance mode associated with a first account and a second assistance mode associated with a second account. The first assistance mode could be the same as or could be different from the second assistance mode. Moreover, the first assistance mode may specify (i) particular operations for a given aerial vehicle to carry out in order to obtain sensor data providing environment information corresponding to a location associated with the first account and (ii) feedback processes to provide feedback, via a feedback system associated with the first account, that corresponds to respective environment information. Whereas, the second assistance mode may specify (i) particular operations for the given aerial vehicle to carry out in order to obtain sensor data providing environment information corresponding to a location associated with the second account and (ii) feedback processes to provide feedback, via a feedback system associated with the second account, that corresponds to respective environment information.

Given this arrangement, the control system may transmit to the given aerial vehicle an indication specifying the particular operations corresponding to the first assistance mode as well as the particular operations corresponding to the second assistance mode. Once the indication is received, the given aerial vehicle may operate in accordance with the first and second assistance mode. In some cases, this may involve the given aerial vehicle simultaneously operating in accordance with the first and second assistance modes, such as by carrying out operation common to both of these modes. While in other cases, the given aerial vehicle may operate in accordance with first assistance mode at certain times and may operate in accordance with second assistance mode at other times, such as by alternating between the assistance modes or operating in accordance with a certain mode on an as-needed basis, among other possibilities.

When the given aerial vehicle operates in accordance with the first assistance mode, the given aerial vehicle may obtain sensor data in accordance with the first assistance mode. Hence, the control system may receive from the given aerial vehicle first environment information for the location associated with the first account. Furthermore, based on the received first environment information, the control system may apply specified feedback processes to initiate feedback in accordance with the first assistance mode via a feedback system associated with the first account. Similarly, when the given aerial vehicle operates in accordance with the second assistance mode, the given aerial vehicle may obtain sensor data in accordance with the second assistance mode. Hence, the control system may receive from the given aerial vehicle second environment information for the location associated with the second account. Furthermore, based on the received second environment information, the control system may apply specified feedback processes to initiate feedback in accordance with the second assistance mode via a feedback system associated with the second account.

By way of example, the given aerial vehicle may simultaneously operate in accordance with both the first and second assistance mode. In doing so, the given aerial vehicle may respectively obtain first and second environment information and the control system then receive this first and second environment information. Based on the first environment information, the control system may determine that a given obstacle is positioned ten meters away from the location associated with the first account. Responsively, the control system may apply specified feedback processes to initiate feedback in accordance with the first assistance mode so as to indicate that the given obstacle is positioned ten meters away from the location associated with the first account. As an example, this feedback may involve vibrational feedback to be provided via a feedback system associated with the first account.

Whereas, based on the second environment information, the control system may determine that the given obstacle is positioned five meters away from the location associated with the second account. Responsively, the control system may apply specified feedback processes to initiate feedback in accordance with the second assistance mode so as to indicate that the given obstacle is positioned five meters away from the location associated with the second account. As an example, this feedback may involve auditory feedback to be provided via a feedback system associated with the second account. Other examples are also possible.

VII. AUGMENTED REALITY FEEDBACK PROCESSES

In an example implementation, the disclosed system may be arranged in the context of feedback processes that initiate feedback taking the form of augmented reality feedback information. More specifically, as noted above, the feedback system disclosed herein may include a display. Moreover, the feedback system disclosed herein may take the form of an HIVID, which could be designed as an augmented reality headset for instance. With this arrangement, the control system may use received environment information as basis for determining visual feedback information. And once the control system determines visual feedback information, the control system may direct an associated feedback system (e.g., the HIVID) to display the determined visual feedback information on the display.

To provide an augmented reality experience via an augmented reality headset, the visual feedback information could be overlaid on video data representative of the location associated with the account. More specifically, the associated feedback system may include a video-capture device configured to provide video data corresponding to the location associated with the account. This video-capture device could be arranged on the feedback system in one of various ways, such as by being arranged as a forward-facing video-capture device that can obtain video data corresponding to a field of view of the user wearing the feedback system. With this arrangement, the control system may direct the associated feedback to display the provided video data as well as the determined visual feedback information on at least a portion of the video data. And in some cases, the control system may specify one or more portions of the video data (and/or of the display device) on which to overlay the visual feedback information.

Yet further, the determined visual feedback information could take various forms. In one case, the visual feedback information may include environment information received an aerial vehicle. For example, the visual feedback information may include video data received from a video-capture device of the aerial vehicle, thereby allowing the display device to display the aerial vehicle's vantage point. In another case, the visual feedback information may include a visual symbol that is representative of an instruction specifying a movement towards a particular destination. For example, the visual symbol could be an arrow that specifies a direction towards which a user should move to ultimately arrive at the particular destination. In yet another case, the visual feedback information may include a visual symbol that is representative of a particular obstacle in an environment corresponding to the location associated with the account. For example, the visual symbol could be a callout bubble that points at the particular obstacle and labels the particular obstacle with a certain word or phrase. In yet another case, the visual feedback information may include a visual symbol that is representative of a particular point-of-interest in an environment corresponding to the location associated with the account. For example, the visual symbol could be a callout bubble that points at the particular point-of-interest (e.g., a particular intended destination) and labels the particular point-of-interest with a certain word or phrase. Other instances and examples are possible as well.

Figure 11:
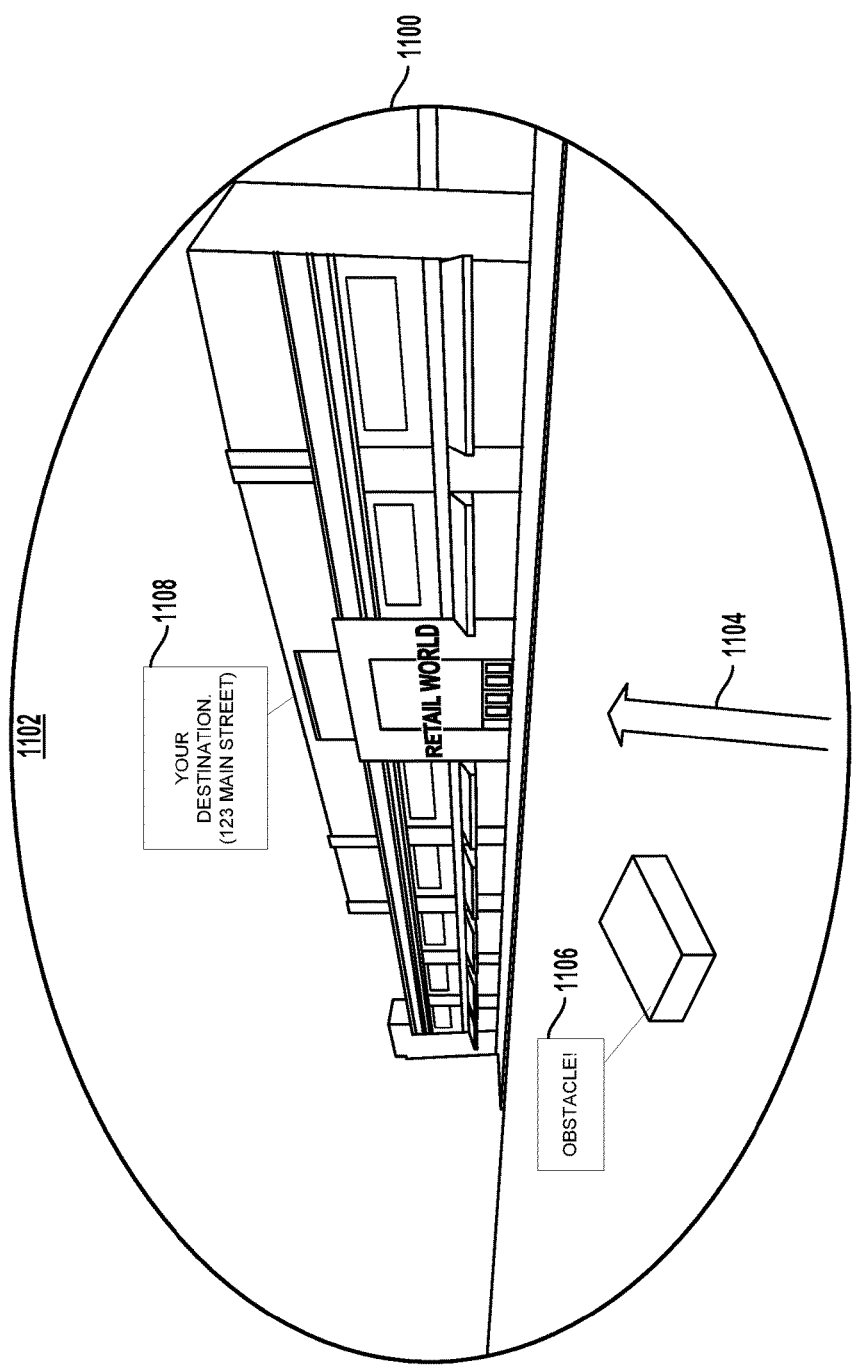
FIG. 11 illustrates an augmented reality viewpoint on a display device, according to an example embodiment.

FIG. 11 illustrates an example augmented reality viewpoint on a display device 1100. As shown, the display device 1100 displays video data 1102 corresponding to the environment shown in the above-mentioned scene 1000. Also, the display device 1100 also shows visual feedback information as being overlaid on various portions of the video data 1102. In particular, the visual feedback information includes an arrow 1104 that specifies a direction towards which a user should move to ultimately arrive at the above-mentioned "Retail World" store location. Additionally, the visual feedback information includes a callout bubble 1106 that points at the obstacle 1002 and labels the obstacle 1002 as "obstacle!", thereby potentially making a user of the system aware of presence of the obstacle 1002. Further, the visual feedback information includes a callout bubble 1108 that points at the "Retail World" store location (e.g., the intended destination) and labels the "Retail World" store location with a phrase "your destination" and the location's address (i.e., 123 Main Street.) Other illustrations are also possible.

VIII. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A method comprising:
   determining, by a control system, a particular assistance mode associated with an account, wherein the particular assistance mode specifies (i) particular operations for an aerial vehicle to carry out in order to obtain sensor data providing environment information corresponding to a location associated with the account and (ii) feedback processes to provide feedback, via a feedback system associated with the account, that corresponds to respective environment information;
   transmitting, by the control system to the aerial vehicle, at least an indication of the particular operations corresponding to the particular assistance mode;
   receiving, by the control system, environment information for the location associated with the account, wherein the received environment information is based on the particular operations corresponding to the particular assistance mode; and
   based on the received environment information for the location associated with the account, applying, by the control system, the specified feedback processes to initiate feedback in accordance with the particular assistance mode via the associated feedback system.

2. The method of claim 1, further comprising:
   receiving, by the control system, input data specifying the particular assistance mode, wherein determining the particular assistance mode is based at least in part on the received input data specifying the particular assistance mode.

3. The method of claim 2, wherein the input data comprises a request for navigation to a particular destination, and wherein determining the particular assistance mode based at least in part on the received input data comprises:
   based on the request for navigation to the particular destination, selecting a navigation mode and arranging the navigation mode to specify a respective feedback process to provide feedback indicative of at least one instruction specifying at least one movement towards the particular destination.

4. The method of claim 2,
   wherein the input data comprises a specification of one or more of the following criteria: (i) a requested extent of feedback to be provided and (ii) a requested form of feedback to be provided, and
   wherein determining the particular assistance mode based at least in part on the received input data comprises arranging the particular assistance mode in accordance with one or more of the specified criteria.

5. The method of claim 1, further comprising:
   before determining the particular assistance mode, receiving, by the control system, preceding environment information corresponding to the location associated with the account, wherein determining the particular assistance mode is based at least in part on the preceding environment information.

6. The method of claim 5, wherein determining the particular assistance mode based at least in part on the preceding environment information comprises:
   based on the preceding environment information, determining one or more of the following criteria: (i) an extent of feedback to be provided and (ii) a form of feedback to be provided; and
   arranging the particular assistance mode to operate in accordance with one or more of the determined criteria.

7. The method of claim 1, wherein the particular operations comprise one or more of the following operations: (i) at least one particular flight procedure to carry out when at least one particular movement associated with the account is observed, (ii) at least particular environment portion for which to obtain sensor data when the at least one particular movement associated with the account is observed, and (iii) at least one particular sensor with which to obtain sensor data when the at least one particular movement associated with the account is observed.

8. The method of claim 1, wherein the feedback processes respectively include one or more of the following forms of feedback: (i) respective auditory feedback, (ii) respective vibrational feedback, and (iii) respective visual feedback.

9. The method of claim 1, wherein the associated feedback system comprises a wearable feedback system including one or more of the following components: (i) at least one listening device, (ii) at least one vibration-generating device, (iii) at least one display, (iv) at least one projector, and (v) at least one light source.

10. The method of claim 1, wherein applying the specified feedback processes to initiate feedback in accordance with the particular assistance mode via the associated feedback system comprises:
    based on the received environment information for the location associated with the account, determining a potential future contact with a particular obstacle; and
    determining a respective feedback process to initiate feedback that indicates the potential future contact with the particular obstacle.

11. The method of claim 10,
    wherein determining the potential future contact comprises determining one or more of the following factors: (i) a distance between the particular obstacle and the location associated with the account and (ii) a time period until the potential future contact occurs, and
    wherein determining a respective feedback process to initiate feedback that indicates the potential future contact with the particular obstacle comprises determining a respective feedback process to initiate feedback that indicates one or more of the determined factors.

12. The method of claim 1, further comprising:
based on the received environment information for the location associated with the account, determining, by the control system, a potential future contact with a particular obstacle; and
in response to determining the potential future contact with the particular obstacle, the control system directing the aerial vehicle to move the particular obstacle to a different location that is selected based on the potential future contact being avoidable.

13. The method of claim 1, wherein the associated feedback system comprises at least a computing device associated with the account, wherein initiating feedback in accordance with the particular assistance mode via the associated feedback system comprises initiate feedback in accordance with the particular assistance mode via the associated computing device, the method further comprising:
determining, by the control system, that the associated computing device is located within a threshold distance away from the location associated with the account, wherein applying the specified feedback processes to initiate feedback in accordance with the particular assistance mode via the associated computing system is at least in response to determining that the associated computing device is located within the threshold distance away from the location associated with the account.

14. The method of claim 1, wherein the associated feedback system comprises a display device, and wherein applying the specified feedback processes to initiate feedback in accordance with the particular assistance mode via the associated feedback system comprises:
based on the received environment information for the location associated with the account, determining visual feedback information and responsively directing the associated feedback system to display, on the display device, the determined visual feedback information.

15. The method of claim 14, wherein the associated feedback system further comprises a video-capture device configured to provide video data corresponding to the location associated with the account, and wherein directing the associated feedback system to display, on the display device, the determined visual feedback information comprises:
directing the associated feedback system to display, on the display device, the determined visual feedback information as being overlaid on at least a portion of the provided video data.

16. The method of claim 14, wherein the determined visual feedback information comprises one or more of the following forms of information: (i) the received environment information, (ii) at least one visual symbol that is representative of at least one instruction specifying at least one movement towards a particular destination, (iii) at least one visual symbol that is representative of a particular obstacle in an environment corresponding to the location associated with the account, and (iv) at least one visual symbol that is representative of a particular point-of-interest in an environment corresponding to the location associated with the account.

17. The method of claim 1, wherein the aerial vehicle is a first aerial vehicle, and wherein the particular assistance mode further specifies particular operations for a second aerial vehicle to carry out in order to obtain sensor data providing environment information corresponding to the location associated with the account, the method further comprising:

transmitting, by the control system to the second aerial vehicle, at least the indication of the particular operations corresponding to the particular assistance mode; and
receiving, by the control system, other environment information for the location associated with the account, wherein the other received environment information is based on the particular operations corresponding to the particular assistance mode, and wherein applying the specified feedback processes is also based on the other received environment information.

18. The method of claim 1, wherein the account is a first account, wherein the particular assistance mode is a first assistance mode, and wherein the received environment information comprises first received environment information, the method further comprising:
determining, by the control system, a second assistance mode associated with a second account, wherein the second assistance mode specifies (i) particular operations for the aerial vehicle to carry out in order to obtain sensor data providing environment information corresponding to a location associated with the second account and (ii) feedback processes to provide feedback, via a feedback system associated with the second account, that corresponds to respective environment information;
transmitting, by the control system to the aerial vehicle, at least an indication of the particular operations corresponding to the second assistance mode;
receiving, by the control system, second environment information for the location associated with the second account, wherein the received second environment information is based on the particular operations corresponding to the second assistance mode; and
based on the received second environment information for the location associated with the second account, applying, by the control system, the specified feedback processes to initiate feedback in accordance with the second assistance mode via the feedback system associated with the second account.

19. A non-transitory computer readable medium having stored therein instructions executable by one or more processors to cause a control system to perform functions comprising:
determining a particular assistance mode associated with an account, wherein the particular assistance mode specifies (i) particular operations for an aerial vehicle to carry out in order to obtain sensor data providing environment information corresponding to a location associated with the account and (ii) feedback processes to provide feedback, via a feedback system associated with the account, that corresponds to respective environment information;
transmitting, to the aerial vehicle, at least an indication of the particular operations corresponding to the particular assistance mode;
receiving environment information for the location associated with the account, wherein the received environment information is based on the particular operations corresponding to the particular assistance mode; and
based on the received environment information for the location associated with the account, applying the specified feedback processes to initiate feedback in accordance with the particular assistance mode via the associated feedback system.

20. A control system comprising:

one or more processors;

a non-transitory computer readable medium; and program instructions stored on the non-transitory computer readable medium and executable by the one or more processors to:

determine a particular assistance mode associated with an account, wherein the particular assistance mode specifies (i) particular operations for an aerial vehicle to carry out in order to obtain sensor data providing environment information corresponding to a location associated with the account and (ii) feedback processes to provide feedback, via a feedback system associated with the account, that corresponds to respective environment information;

transmit, to the aerial vehicle, at least an indication of the particular operations corresponding to the particular assistance mode;

receive environment information for the location associated with the account, wherein the received environment information is based on the particular operations corresponding to the particular assistance mode; and based on the received environment information for the location associated with the account, apply the specified feedback processes to initiate feedback in accordance with the particular assistance mode via the associated feedback system.

\* \* \* \* \*